United States Patent
Badii et al.

(10) Patent No.: US 12,346,580 B2
(45) Date of Patent: Jul. 1, 2025

(54) SYSTEMS AND METHODS FOR MANAGING METRIC DATA

(71) Applicant: Bitdrift, Inc., San Francisco, CA (US)

(72) Inventors: Behrooz Badii, Westport, CT (US); Yann Thomas Ramin, Folsom, CA (US)

(73) Assignee: BITDRIFT, INC., San Francisco, CA (US)

( * ) Notice: Subject to any disclaimer, the term of this patent is extended or adjusted under 35 U.S.C. 154(b) by 0 days.

(21) Appl. No.: 18/178,313

(22) Filed: Mar. 3, 2023

(65) Prior Publication Data

US 2024/0295974 A1 Sep. 5, 2024

(51) Int. Cl.
G06F 3/06 (2006.01)

(52) U.S. Cl.
CPC .......... G06F 3/0626 (2013.01); G06F 3/0653 (2013.01); G06F 3/0673 (2013.01)

(58) Field of Classification Search
CPC ..... G06F 3/0626; G06F 3/0653; G06F 3/0673
See application file for complete search history.

(56) References Cited

U.S. PATENT DOCUMENTS

| | | |
|---|---|---|
| 7,103,843 B2 | 9/2006 | Hand et al. |
| 9,791,291 B1 | 10/2017 | Yamashita et al. |
| 9,898,791 B1 | 2/2018 | Stumpf et al. |
| 10,198,339 B2 | 2/2019 | Salunke et al. |
| 10,248,508 B1 | 4/2019 | Park et al. |
| 10,270,668 B1 | 4/2019 | Thompson et al. |
| 10,509,769 B1 | 12/2019 | Shilane et al. |
| 2003/0110007 A1 | 6/2003 | Mcgee et al. |
| 2010/0174677 A1 | 7/2010 | Zahavi et al. |
| 2012/0072925 A1 | 3/2012 | Jenkins et al. |
| 2012/0226390 A1 | 9/2012 | Adams et al. |
| 2014/0129302 A1 | 5/2014 | Amin et al. |
| 2014/0129951 A1 | 5/2014 | Amin et al. |
| 2014/0365250 A1 | 12/2014 | Ikeda et al. |
| 2016/0026377 A1 | 1/2016 | Dreicer et al. |
| 2016/0055605 A1 | 2/2016 | Kim et al. |
| 2016/0337294 A1 | 11/2016 | Garg et al. |
| 2016/0356615 A1 | 12/2016 | Arata et al. |

(Continued)

FOREIGN PATENT DOCUMENTS

| | | |
|---|---|---|
| CN | 110245051 A1 | 9/2019 |
| WO | 2012143300 A1 | 10/2012 |

OTHER PUBLICATIONS

International Search Report & Written Opinion as received in PCTUS2022/075025 dated Dec. 1, 2022.

(Continued)

*Primary Examiner* — Jason W Blust

(74) *Attorney, Agent, or Firm* — Lee Sullivan Shea & Smith LLP

(57) ABSTRACT

A computing platform may be configured to (i) receive metric data for a metric that was produced by a metric producer, (ii) identify a metric handling rule that applies to the metric, wherein the identified metric handling rule comprises a handling action of storing metric data for the metric in a specified storage location (e.g., a different tier of a multi-tier storage architecture), and (iii) handle the received metric data for the metric in accordance with the identified metric handling rule by storing the received metric data in the specified storage location.

20 Claims, 9 Drawing Sheets

(56) References Cited

U.S. PATENT DOCUMENTS

| | | |
|---|---|---|
| 2017/0017712 A1 | 1/2017 | Gartland et al. |
| 2017/0060654 A1 | 3/2017 | Nandakumar et al. |
| 2017/0075942 A1 | 3/2017 | Childs et al. |
| 2017/0115125 A1 | 4/2017 | Outwater et al. |
| 2017/0127215 A1 | 5/2017 | Khan |
| 2017/0149644 A1* | 5/2017 | Rapoport ............ G06F 11/3476 |
| 2017/0220966 A1 | 8/2017 | Wang |
| 2017/0228846 A1 | 8/2017 | Mohr et al. |
| 2017/0316221 A1 | 11/2017 | Melanchenko et al. |
| 2017/0352125 A1 | 12/2017 | Dicker et al. |
| 2018/0129503 A1 | 5/2018 | Narayan et al. |
| 2018/0211542 A1 | 7/2018 | Narayan et al. |
| 2018/0260787 A1 | 9/2018 | Xi |
| 2018/0300660 A1 | 10/2018 | Coan et al. |
| 2020/0106690 A1 | 4/2020 | Rapoport et al. |
| 2020/0201850 A1 | 6/2020 | Haggie et al. |
| 2020/0264965 A1 | 8/2020 | Harutyunyan et al. |
| 2021/0004675 A1 | 1/2021 | Ramesh et al. |
| 2021/0073028 A1 | 3/2021 | Li et al. |
| 2021/0182416 A1 | 6/2021 | Pang et al. |
| 2021/0256576 A1 | 8/2021 | Chew et al. |
| 2021/0281483 A1 | 9/2021 | Malpani et al. |
| 2022/0358023 A1 | 11/2022 | Moser et al. |

OTHER PUBLICATIONS

International Search Report & Written Opinion as received in PCTUS2024/018229 dated Jun. 28, 2024.

Thalheim, Jorg et al. Sieve: Actionable Insights from Monitored Metrics in Microservices. arXiv. Sep. 20, 2017. 17 pages [online], Retrieved from the Internet <URL: https://doi.org/10.48550/arXiv.1709.06686>.

European Patent Office, European Extended Search Report mailed on Apr. 22, 2025, issued in connection with European Application No. 22862201.5 11 pages.

* cited by examiner

| Metric | Utilization Likelihood | Handling Action(s) |
|---|---|---|
| node_memory_usage_bytes {app="app_1"} | 25% | Store in Lower Storage Tier Sample |
| node_memory_usage_bytes {app="app_2"} | 45% | Store in Lower Storage Tier |
| http_request_total | 90% | N/A [Default Handling] |

FIG. 3B

SYSTEMS AND METHODS FOR MANAGING METRIC DATA

BACKGROUND

It is becoming increasingly common for computing devices to generate and output metric data that provides information about the state and/or performance of the computing devices. For example, a server configured to execute one or more server applications (e.g., containerized applications such as microservices) may generate and output metric data that provides information about the state and/or performance of some aspect of the server. As another example, a client device configured to execute one or more client applications (e.g., a mobile application, desktop application, web application, or the like) may generate and output metric data that provides information about the state and/or performance of some aspect of the client device. As yet another example, a computing device may generate and output metric data that provides information about the state and/or performance of some aspect of one or more other computing devices. Other examples of computing devices that generate and output metric data may exist as well.

In practice, an organization may be interested in monitoring metric data being produced by a wide array of different computing devices (e.g., servers within the organization's back-end platform, client devices running instances of a client application developed by the organization, etc.), and in order to make use of the metric data produced by these disparate software components, the organization may deploy a centralized "metrics management platform" that functions to collect and store metric data from various computing devices that are producing metric data (referred to herein as "metrics producers") so that the metric data can later be accessed and reviewed. For instance, after a metrics management platform collects and stores metric data from different metrics producers, individuals associated with the organization (e.g., developers, engineers, analysts, etc.) can review the stored metric data in order to gain visibility into the state and/or performance of the metrics producers.

SUMMARY

Disclosed herein is new technology for intelligently managing metric data that is produced by metrics producers.

In one aspect, the disclosed technology may take the form of a method implemented by a computing platform that involves (i) receiving metric data for a metric that was produced by a metric producer, (ii) identifying a metric handling rule that applies to the metric, wherein the identified metric handling rule comprises a handling action of storing metric data for the metric in a specified storage location, and (iii) handling the received metric data for the metric in accordance with the identified metric handling rule by storing the received metric data in the specified storage location.

In at least some embodiments, the specified storage location of identified metric handling rule may comprise a specified tier of a multi-tier storage architecture of the computing platform. For instance, in some embodiments, the specified tier of the multi-tier storage architecture may comprise a second tier of the multi-tier storage architecture that differs from a first tier where metric data is stored by default. And in such embodiments, the first tier may comprise a hot tier of the multi-tier storage architecture and the second tier may comprise a cold tier of the multi-tier storage architecture, among various other possibilities.

Further, in at least some embodiments, the identified metric handling rule may comprise other types of handling actions as well. For instance, in some embodiments, the identified metric handling rule may additionally comprise a handling action of (i) sampling metric data for the metric according to a given sampling rate, (ii) compressing metric for the data, and/or (iii) conditionally storing metric data for the metric based on a comparison to previously-stored metric data for the metric, among other possibilities.

Further, in at least some embodiments, the identified metric handling rule may be created based on a determination of a predicted likelihood that metric data for the metric will be utilized in the future. And in such embodiments, the function of determining the predicted likelihood that metric data for the metric will be utilized in the future may involve an analysis of metric utilization information for the metric, which may take various forms, examples of may include (i) read activity information, (ii) write activity information, and/or (iii) query activity information.

Still further, in at least some embodiments, the identified metric handling rule may comprise a metric handling rule for a set of multiple metrics that encompasses the metric, In another aspect, the disclosed technology may take the form of a computing platform comprising at least one processor, at least one non-transitory computer-readable medium, and program instructions stored on the at least one non-transitory computer-readable medium that are executable by the at least one processor such that the computing platform is configured to carry out the functions of the aforementioned method.

In yet another aspect, the disclosed technology may take the form of a non-transitory computer-readable medium comprising program instructions stored thereon that are executable to cause a computing platform to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 3B illustrates a first possible embodiment of how a predicted likelihood of a given set of one or more metrics being utilized in the future may be used to facilitate the creation of a metric handling rule for the given set of one or more metrics, in accordance with the present disclosure;

DETAILED DESCRIPTION

As noted above, it is becoming increasingly common for computing devices to generate and output metric data that provides information about the state and/or performance of the computing devices. For example, a server configured to execute one or more server applications (e.g., containerized applications such as microservices) may generate and output metric data that provides information about the state and/or performance of some aspect of the server. As another example, a client device configured to execute one or more client applications (e.g., a mobile application, desktop application, web application, or the like) may generate and output metric data that provides information about the state and/or performance of some aspect of the client device. As yet another example, a computing device may generate and output metric data that provides information about the state and/or performance of some aspect of one or more other computing devices. Other examples of computing devices that generate and output metric data may exist as well.

In practice, an organization may be interested in monitoring metric data being produced by a wide array of different computing devices (e.g., servers within the organization's back-end platform, client devices running instances of a client application developed by the organization, etc.), and in order to make use of the metric data produced by these disparate software components, the organization may deploy a centralized "metrics management platform" that functions to collect and store metric data from various computing devices that are producing metric data (referred to herein as "metrics producers") so that the metric data can later be accessed and reviewed. For instance, after a metrics management platform collects and stores metric data from different metrics producers, individuals associated with the organization (e.g., developers, engineers, analysts, etc.) can review the stored metric data in order to gain visibility into the state and/or performance of the metrics producers.

Figure 1:
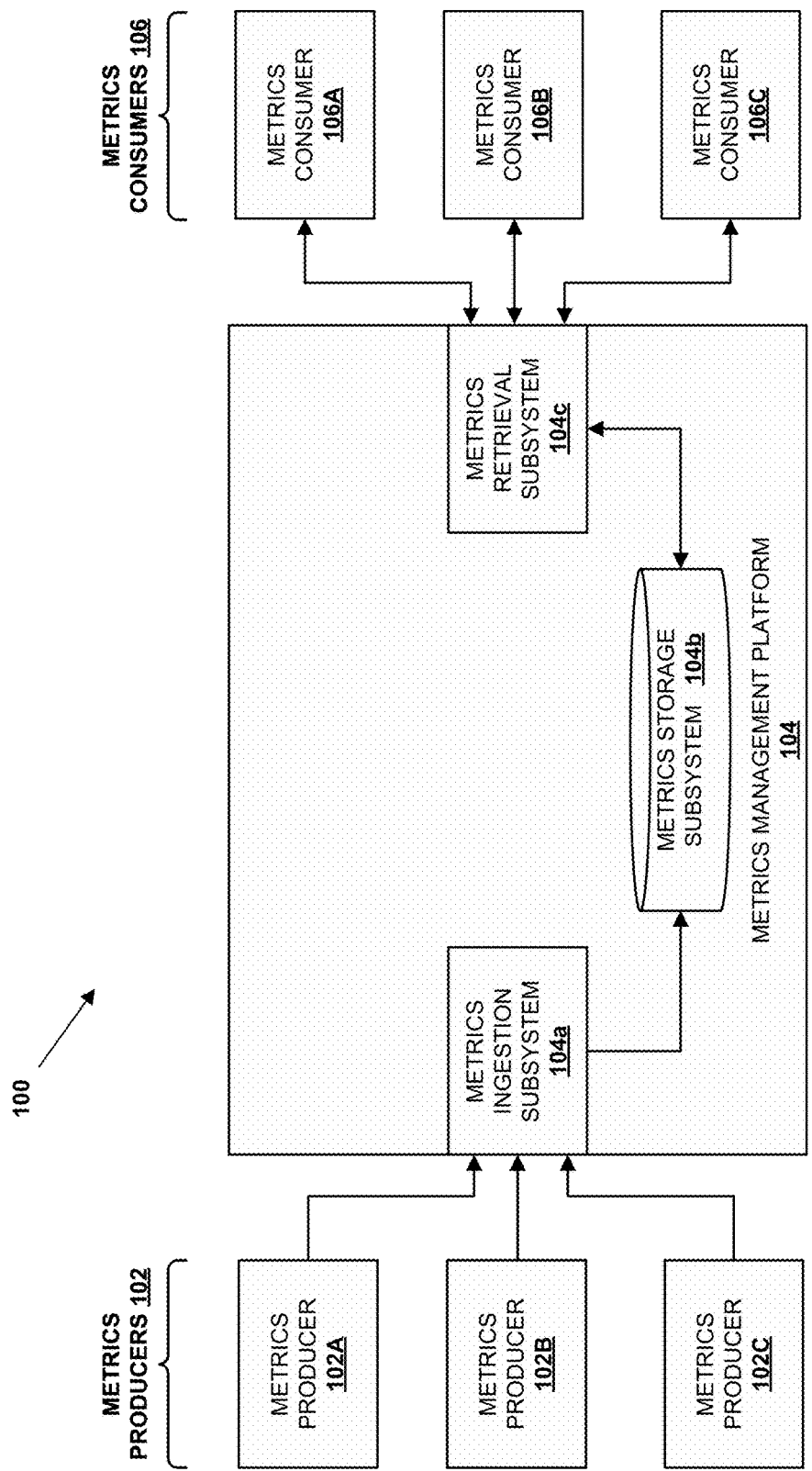
FIG. 1 illustrates an example network in which a metrics management platform may be utilized to collect and store metric data being produced by metrics producers and then make that stored metric data available to metrics consumers, in accordance with the present disclosure.

To illustrate with an example, FIG. 1 shows an example network environment 100 in which a metrics management platform may be utilized to collect and store metric data being produced by metrics producers and then make that stored metric data available to metrics consumers. As shown in FIG. 1, the network environment 100 may (i) include a number of metrics producers 102, of which three representative metrics producers 102A, 102B, and 102C are shown as examples, (ii) a metrics management platform 104, and (iii) a number of metrics consumers 106, of which three representative metrics consumers 106A, 106B, and 106C are shown as representative examples.

In general, each of the metrics producers 102 may comprise a computing device installed with software for producing metric data and transmitting such metric data to the metrics management platform 104. Such a metrics producer 102 may take any of various forms. For instance, as one possibility, a metrics producer 102 could take the form of a server configured to execute one or more server applications (e.g., containerized applications such as microservices), which may produce metric data that provides information about the state and/or performance of the server and/or the server applications running thereon. As another possibility, a metrics producer 102 could take the form of a client device configured to execute one or more client applications (e.g., a mobile application, desktop application, web application, or the like), which may produce metric data that provides information about the state and/or performance of the client device and/or the one or more client applications running thereon. As yet another example, a metrics producer 102 could take the form of a computing device that produces metric data related to the state and/or performance of one or more other computing devices and/or the software running thereon (e.g., cluster-level metric data for a cluster of nodes running containerized applications). A metrics producer 102 could take some other form as well.

Further, each of the metrics producers 102 may be configured to produce metric data for a respective set of one or more metrics, where each such metric comprises a time-series variable that provides information about the state and/or performance of some aspect of a computing device (or a collection of computing devices). Such a metric could take any of various forms.

For instance, as one possibility, a metrics producer 102 may produce metric data for a metric that provides a numerical measure of the extent of a certain type of event that has occurred at a computing device, such as a count or rate of a certain type of network request that has been received by the computing device or a count or rate of a certain type of user request that has been received by the computing device, among other possible examples. As another possibility, a metrics producer 102 may produce metric data for a metric that provides a numerical measure of the time it takes for a certain type of event to be carried out at a computing device, such as a processing or transmission duration for a certain type of network request that is handled by the computing device or a processing duration for a certain type of user request that is handled by the computing device, among other possible examples. As yet another possibility, a metrics producer 102 may produce metric data for a metric that provides a numerical measure of the extent of utilization of a certain type of resource at a computing device, such as an extent of memory utilization, CPU utilization, disk utilization, etc. at the computing device, among other possible examples. As still another possibility, a metrics producer 102 may produce metric data for a metric that provides a numerical measure of the extent of a certain type of error incurred while processing a certain type of event at a computing device, such as a count or rate of errors incurred while processing a certain type of network request or a count or rate of errors incurred while processing a certain type of user request, among other possible examples. In practice, each of the foregoing types of metrics could be produced at an application-level such that the metric reflects the state and/or performance of an individual software application running on a computing device (e.g., a particular server application or a particular client application), a device-level such that the metric reflects the state and/or performance of a computing device independent of any particular software application (e.g., a server or a client device), or a cluster-level such that the metric reflects the state and/or performance of a cluster of multiple computing devices (e.g., a cluster of multiple servers or multiple client devices), among other possibilities.

A metrics producer 102 may produce metric data for various other types of metrics as well, including but not limited to a metric that provides a numerical measure of how many instances of an item of interest (e.g., number of running containers, number of running application, etc.) exist across the network environment 100, among various other possible examples.

Further yet, in practice, a metrics producer 102 may produce metric data for each metric according to a respective sampling interval that defines the rate at which samples of the metric are to be produced by the metrics producer 102. For instance, if a metrics producer 102 is configured to produce metric data for a given metric according to a 1-minute sampling interval, the metrics producer 102 may function to produce a time series of samples for the given metric that includes a new timestamped sample of the given metric every 1 minute.

Still further, in practice, a metrics producer 102 may identify each unique metric for which it is producing metrics data in various ways. For instance, according to one possible identification scheme, a metrics producer 102 may identify each unique metric using (i) a metric name, which identifies a general type of information that is represented by the metric, and (ii) a set of one or more labels (or sometimes referred to as "dimensions") that identifies a specific instantiation of the metric name. To illustrate with a first representative example, a metric name could identify a general type of information such as total number of HTTP requests handled (e.g., http_requests_total), and the set of one or more labels could identify a particular type of HTTP request (e.g., type="400" and/or method="POST"), a particular host (e.g., host="10.2.1.1"), and/or a particular application (e.g., app="app_1") for which the total number of HTTP requests is to be captured, which defines a specific instantiation of this metric name. To illustrate with a second representative example, a metric name could identify a general type of information such as memory usage in bytes (e.g., node_memory_usage_bytes), and the set of one or more labels could identify a particular host (e.g., host="10.2.1.1") and/or a particular application (e.g., app="app_1") for which the memory usage in bytes is to be captured, which defines a specific instantiation of this metric name. Many other examples of metric names and metric labels are possible as well. Further, a metrics producer 102 may identify each unique metric for which it is producing metrics data using various other identification schemes as well, including identification schemes that use a single type of identifier.

Each of the metrics producers 102 may transmit the metric data to the metrics management platform 104 over a respective communication path. Each of these respective communication paths may generally comprise one or more data networks and/or data links, which may take any of various forms. For instance, each respective communication path between a metrics producer 102 and the metrics management platform 104 may include any one or more of Personal Area Networks (PANs), Local Area Networks (LANs), Wide Area Networks (WANs) such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, one example of which may include a metrics aggregation system, among other possibilities. Many other configurations are also possible.

Turning to the metrics management platform 104, as shown in FIG. 1, the metrics management platform 104 may comprise various functional subsystems, including a metrics ingestion subsystem 104a, a metrics storage subsystem 104b, and a metrics retrieval subsystem 104c, each of which may be configured to carry out certain back-end functionality of the metrics management platform 104 in accordance with the present disclosure.

For instance, the metrics ingestion subsystem 104a of the metrics management platform 104 may generally be configured to (i) receive and ingest metric data from the metrics producers 102, (ii) optionally perform certain pre-processing operations on the received metric data (e.g., validation, cleansing, deduplication, filtering, aggregation, summarization, enrichment, restructuring, reformatting, translation, mapping, etc.), and then (iii) write the ingested metric data to the metrics storage subsystem 104b, among other possible functions carried out by the metrics ingestion subsystem 104a.

Further, the metrics storage subsystem 104b of the metrics management platform 104 may generally be configured to store metric data that is received and ingested by the metrics management platform 104. In practice, the metrics storage subsystem 104b may comprise a set of one or more data stores that are configured to store metric data, where each such data store could take any of various forms, examples of which may include a NoSQL database (e.g., a time series database, columnar database, document database, key-value database, graph database, etc.), a relational database (e.g., an Online Transactional Processing (OLTP) database), a file-based data store (e.g., Hadoop Distributed File System), an object-based data store (e.g., Amazon S3, Azure Blob, etc.), a data warehouse (which could be based on one or more of the foregoing types of data stores), a data lake (which could be based on one or more of the foregoing types of data stores), a message queue, and/or a streaming event queue, among other possibilities.

In at least some implementations, the metrics storage subsystem 104b could take the form of a multi-tier storage architecture (or sometimes referred to as a "tiered" storage architecture) comprising multiple different tiers of data stores that are designed to store different classes of metric data.

For instance, as one possibility, the metrics storage subsystem 104b may take the form of a multi-tier storage architecture comprising two tiers of data stores: (i) a first tier of one or more data stores that are designed to store metric data that is more frequently accessed and/or considered to be of greater importance, which is sometimes referred to as a "hot tier" of data storage, and (ii) a second tier of one or more data stores that are designed to store metric data that is less frequently accessed and/or considered to be of lesser importance, which is sometimes referred to as a "cold tier" of data storage. In this respect, the data stores in the first tier may have characteristics better suited for storage of metric data that is more frequently accessed and/or considered to be of greater importance, such as a data store that has a higher level of performance (e.g., lower latency, higher throughput, and/or greater availability, among other possible aspects of a data store's performance) and/or a lower access cost as compared to the data stores that may be used for the second storage tier but has a higher storage cost than the data stores that may be used for the second storage tier, whereas the data stores in the second tier may have characteristics better suited for storage of metric data that is less frequently accessed and/or considered to be of lesser importance, such as a data store that has a lower storage cost than the data stores that may be used for the first storage tier but perhaps has a lower level of performance (e.g., higher latency, lower throughput, and/or lesser availability, among other possible aspects of a data store's performance) and/or a higher access cost as compared to the data stores that may be used for the first storage tier, among other possible distinctions between the data stores in the first and second storage tiers.

As another possibility, the metrics storage subsystem 104b may take the form of a multi-tier storage architecture comprising three or more tiers of data stores, where each such tier is designed to store metric data having a different level of access frequency and/or a different level of importance. For instance, in line with the discussion above, the data stores in higher tiers may generally have characteristics better suited for storage of metric data that is more frequently accessed and/or considered to be of greater importance, such as data stores having a higher level of performance and/or a lower access cost but a higher storage cost, whereas the data stores in lower tiers may generally have characteristics better suited for storage of metric data that is less frequently accessed and/or considered to be of lesser importance, such as data stores having a lower storage cost but a lower level of performance and/or a higher access cost. Some representative examples of multi-tier storage architectures having three or more storage tiers include those employed by cloud-based storage services such as Amazon Web Services (AWS) (e.g., multiple different S3 tiers), Google Cloud (e.g., standard, nearline, coldline, and archive tiers), and Microsoft Azure (e.g., hot, cool, and archive tiers), but it will be understood that a multi-tier storage architecture having three or more storage tiers may take various other forms as well.

The metrics storage subsystem 104b may take other forms as well.

Further yet, the metrics retrieval subsystem 104c of the metrics management platform 104 may be generally configured to (i) receive requests from the metrics consumers 106 for metric data stored within the metrics storage subsystem 104b, (ii) retrieve the requested metric data from the metrics storage subsystem 104b, and (iii) return the requested metric data to the metrics consumers 106, among other possible functions carried out by the metrics retrieval subsystem 104c.

In practice, the metrics management platform 104 may comprise some set of physical computing resources (e.g., processors, data storage, etc.) utilized to implement the foregoing functional subsystems. This set of physical computing resources may take any of various forms. As one possibility, the metrics management platform 104 may comprise cloud computing resources supplied by a third-party provider of "on demand" cloud computing resources, such as AWS, Amazon Lambda, Google Cloud, Microsoft Azure, or the like. As another possibility, the metrics management platform 104 may comprise "on-premises" computing resources of the given software provider (e.g., servers owned by the given software provider). As yet another possibility, the metrics management platform 104 may comprise a combination of cloud computing resources and on-premises computing resources. Other implementations of the metrics management platform 104 are possible as well.

Further, in practice, the functional subsystems of the example metrics management platform 104 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Turning now to the metrics consumers 106, each of the metrics consumers 106 may comprise a computing device installed with software that is programmed to consume metric data from the metrics management platform 104. Such a metrics consumer 106 may take any of various forms. As one possibility, a given metrics consumer 106 may take the form of a server installed with a server application (e.g., a back-end service such as a microservice) that is configured to request and receive metric data from the metrics management platform 104. Such a server application could take any of various forms, some examples of which may include (i) a server application that drives client-side applications for presenting metric data on a dashboard, which may be referred to herein as a "dashboard engine," or (ii) a server application that analyzes metric data for purposes of determining whether to issue alerts, which may be referred to herein as an "alert engine." Further, in practice, such a server application either could be hosted by the same organization that hosts the metrics management platform 104, in which case the server application may request and receive the metric data via an internal Application Programming Interface (API) (or the like) of the organization, or could be hosted by a different organization than the one that hosts the metrics management platform 104, in which case the server application may request and receive the metric data via an external API (or the like) of the organization hosting the metrics management platform 104, among various other possibilities. As another possibility, a given metrics consumer 106 may take the form of a client device installed with a client application that is configured to request and receive metric data from the metrics management platform 104 via an external API (or the like) of the organization hosting the metrics management platform 104. A given metrics consumer 106 may take other forms as well.

Further, each of the metrics consumers 106 may be configured to communicate with the metrics management platform 104 over a respective communication path that may generally comprise one or more data networks and/or data links, which may take any of various forms. For instance, each respective communication path between a metrics consumer 106 and the metrics management platform 104 may include any one or more of PANs, LANs, WANs such as the Internet or cellular networks, cloud networks, and/or point-to-point data links, among other possibilities. Further, the data networks and/or links that make up each respective communication path may be wireless, wired, or some combination thereof, and may carry data according to any of various different communication protocols. Although not shown, the respective communication paths may also include one or more intermediate systems, one example of which may include a metrics aggregation system, among other possibilities. Many other configurations are also possible.

This approach of collecting, aggregating, and storing metric data from various different metrics producers at a centralized metrics management platform may provide various benefits, including providing an organization with a single platform for accessing and reviewing metric data that is relevant to the organization, which improves efficiency, and perhaps also enabling the organization to gain deeper insights about the behavior of its software through analysis of a larger sample size of metric data produced by multiple different instances of the same types of software components, among other possible benefits.

However, as the volume of metric data that is collected, aggregated, and stored by such a centralized metrics management platform continues to grow, certain problems may arise. For instance, as the volume of metric data that is collected, aggregated, and stored by a centralized metrics management platform grows, this may increase (i) the bandwidth required to deliver the metric data to the centralized metrics management platform, (ii) the processing power required to ingest, integrate, and process the metric data, and/or (iii) the storage capacity required to store the metric data, which may in turn increase the cost of the centralized metrics management platform and may eventually make it impractical or infeasible for an organization to continue operating the centralized metrics management platform (or at least make it impractical or infeasible to continue ingesting and storing the full array of metric data being produced). Additionally, as the volume of metric data that is ingested, integrated, processed, and stored by a centralized metrics management platform grows, this may degrade certain aspects of the centralized management platform's performance, such as by increasing the time it takes to access metric data that is stored at the centralized metrics management platform when processing read requests, queries, or the like, which may in turn degrade user experience and/or introduce undesirable delay into functionality that relies on accessing metric data, such as dashboard or alerting functionality. The growth of metric data being ingested, integrated, processed, and stored by a centralized metrics management platform may present various other challenges for the centralized metrics management platform as well.

These foregoing problems are compounded by the fact that a large percentage of the metric data being produced by metrics producers tends to have limited value. For instance, the metric data that is produced by a metrics producer could be comprised of metric data for metrics that are rarely (if ever) accessed by metrics consumers and/or metric data that is highly repetitive (e.g., 1 minute samples of a metric having a value that rarely changes over time), among other possible factors that limit the value of metric data.

One way to address this problem would be to re-program the software of the metrics producers to modify the extent of metric data being produced by such metrics producers, but this rigid approach would be time consuming and cumbersome. Indeed, such an approach would typically require the software of each individual metric producer to be evaluated and then potentially re-programmed in order to modify the extent of metric data being produced by the individual metrics producer. Further, re-programming the software of a metrics producer to modify the extent of metric data being produced could inadvertently give rise to other technical problems with the operation of the software running at the metrics producer. Further yet, re-programming the software of a metrics producer to modify the extent of metric data being produced could lead to various other inefficiencies, particularly in scenarios where the value of the metric data being produced by a metric producer could change over time. For example, a situation could arise where metric data for a given metric is not being consumed by any metric consumer and the software of a metric producer is re-programmed to stop production of metric data for the given metric, but then a metric consumer thereafter becomes configured to run a saved query that relies on metric data for the given metric. In such a scenario, the query could not be run as intended unless and until the software of a metric producer is re-programmed again to resume production of metric data for the given metric, which would require additional development effort and introduce delay in the use of the query. Still further, once the software of a metric producer was re-programmed to stop production of metric data for a given metric, this means that such metric data will be completely unavailable for future use.

In view of the foregoing, it would be desirable to configure a centralized metrics management platform to make intelligent storage handling decisions with respect to the metric data that is produced by metrics producers and ingested by the centralized metrics management platform, so that metric data for different metrics can be handled differently (e.g., metric data for higher-value metrics can be handled differently than metric data for lower-value metrics). However, there are several technical challenges that make it difficult for a centralized metrics management platform to accomplish this goal. First, the value of metric data produced by metrics producers tends to widely vary-some metric data may have little or no value, other metric data may have only intermediate value, and still other metric data may have high value—but this value information is not directly encoded into the metric data received from metrics producers. Second, the value of metric data for a given metric can change over time, which may in turn change the appropriate manner for handling such metric data. For example, metric data for a given metric may initially be deemed to have low value (e.g., due to the fact that metric data for the given metric is not being consumed by any metric consumer), in which case the metric data should be handled in a way that is suitable for lower-value metric data, but at some later time the metric data for the given metric may thereafter be deemed to have high value (e.g., due to the creation of a new saved query that relies on metric data for the given metric), in which case the prior approach for handling metric data may no longer be suitable. Third, because a centralized metrics management platform is typically tasked with handling large volumes of metric data produced by a wide range of different metrics producers, the centralized metrics management platform generally needs to be capable of making storage handling decisions for incoming metric data in a relatively quick and efficient manner, because otherwise, the centralized metrics management platform could start to become a bottleneck for higher-value metric data that should be stored and made available for consumption in a timely manner. For these and other reasons, there remains a need for technology that enables a centralized metrics management platform to make intelligent storage handling decisions with respect to the metric data that is collected and aggregated by the centralized metrics management platform.

To address these and other problems, disclosed herein is new technology for intelligently managing metric data that is produced by metrics producers. One aspect of the disclosed technology takes the form of a new functional subsystem of a metrics management platform referred to herein as a "metrics management engine," which is configured to carry out various functionality in order to facilitate intelligent management of metric data that is produced by metrics producers.

For instance, the disclosed metrics management engine may be configured to perform an analysis of metric data that has previously been received from metrics producers in order to inform the future handling of metric data that is received from the metrics producers, where the results of such an analysis could be utilized by the metrics management engine to facilitate the creation of "metric handling rules" that define particular storage handling actions to be taken on metric data for particular metrics. As described in further detail below, such an analysis for a given set of one or more metrics may involve (i) obtaining information that is indicative of the utilization of the given set of one or more metrics over some window of time in the past, which may be referred to herein as "metric utilization information" for the given set of one or more metrics, (ii) based on the obtained metric utilization information, predicting a likelihood that the given set of one or more metrics will be utilized in the future, and (iii) using the predicted likelihood that the given set of one or more metrics will be utilized in the future to facilitate the creation (and deployment) of a metric handling rule for the given set of one or more metrics that defines a set of one or more storage handling actions to be taken on received metric data for the given set of one or more metrics, where such storage handling actions may include blocking the received metric data from persistent storage, storing the received metric data in a specified storage location (e.g., a specified tier of a multi-tier storage architecture that differs from the "default" storage tier), sampling the received metric data, and/or compressing the received metric data, among other possible examples of storage handling actions that may be defined by a metric handling rule.

The disclosed metrics management engine may also be configured to determine whether and to what extent metrics data received from metrics producers is to be stored at the metrics management platform. As described in further detail below, this functionality may involve the application of certain metric handling rules that each defines a respective set of one or more storage handling actions that is to be taken on received metric data for a respective set of one or more metrics, examples of which may include blocking the received metric data from persistent storage, storing the received metric data in a specified storage location (e.g., a specified tier of a multi-tier storage architecture that differs from the "default" storage tier), sampling the received metric data, and/or compressing the received metric data, among other possible examples of storage handling actions that may be defined by a metric handling rule. As one particular example to illustrate, if the default storage handling action for received metric data is to store the received metric data in a first storage tier of a multi-tier storage architecture (e.g., a hot tier) without any blocking, sampling, compression, or the like, a given metric handling rule may define a handling action of storing metric data for a particular metric (or a related set of multiple metrics) in a second storage tier of the multi-tier storage architecture (e.g., a cold tier). In this way, the metric management engine allows metric data for different metrics (e.g., metrics having different levels of utilization as determined based on read activity, write activity, and/or query activity) to be intelligently stored in different tiers of a multi-tier storage architecture.

The disclosed metrics management engine may be configured to carry out other functionality in order to facilitate intelligent management of metric data that is produced by metrics producers as well.

Another aspect of the disclosed technology takes the form of a "metrics management agent," which is a software component that may be installed at a metrics producer and may be configured to determine whether and to what extent the metric data produced by the metrics producer is to be transmitted to the metrics management platform. As described in further detail below, this functionality may involve the application of certain metric handling rules that each defines a respective set of one or more handling actions that is to be taken on produced metric data for a respective set of one or more metrics, examples of which may include blocking the produced metric data from being transmitted, sampling the produced metric data before transmission, and/or compressing the produced metric data before transmission, among other possible examples of transmission handling actions that may be defined by a metric handling rule.

The disclosed metrics management agent may be configured to carry out other functionality in order to facilitate intelligent management of metric data that is produced by metrics producers as well.

Advantageously, the disclosed technology may provide various improvements to existing metrics management platforms. For instance, the disclosed technology enables a metrics management platform to make more intelligent storage handling decisions for metric data, such as by blocking, storing in a specified storage location (e.g., a different storage tier), sampling, and/or compressing, metric data for metrics that have a lower level of utilization and/or are otherwise considered to provide lesser value, which may reduce the volume of metric data that is stored by the metrics management platform-either in its "default" storage location (e.g., the hot tier of a multi-tier storage architecture) or across the platform as whole—and may thereby reduce the cost and/or improve the performance of the metrics management platform. Further, the disclosed technology enables a metrics management platform to update its handling of metric data for a metric based on an analysis of metric utilization information for the metric, which allows the metrics management platform to adapt to changes in the utilization and/or value of metric data for a metric over time. Further yet, the disclosed technology provides the ability to make intelligent transmission decisions at a metrics producer before metric data is even transmitted to a metrics management platform, which not only reduces the volume of metric data that is stored by the metrics management platform but also has the additional benefit of reducing the volume of metric data that is transmitted to the metrics management platform in the first place, thereby reducing transmission costs. The disclosed technology may provide various other improvements to existing metrics management platforms as well.

Figure 2:
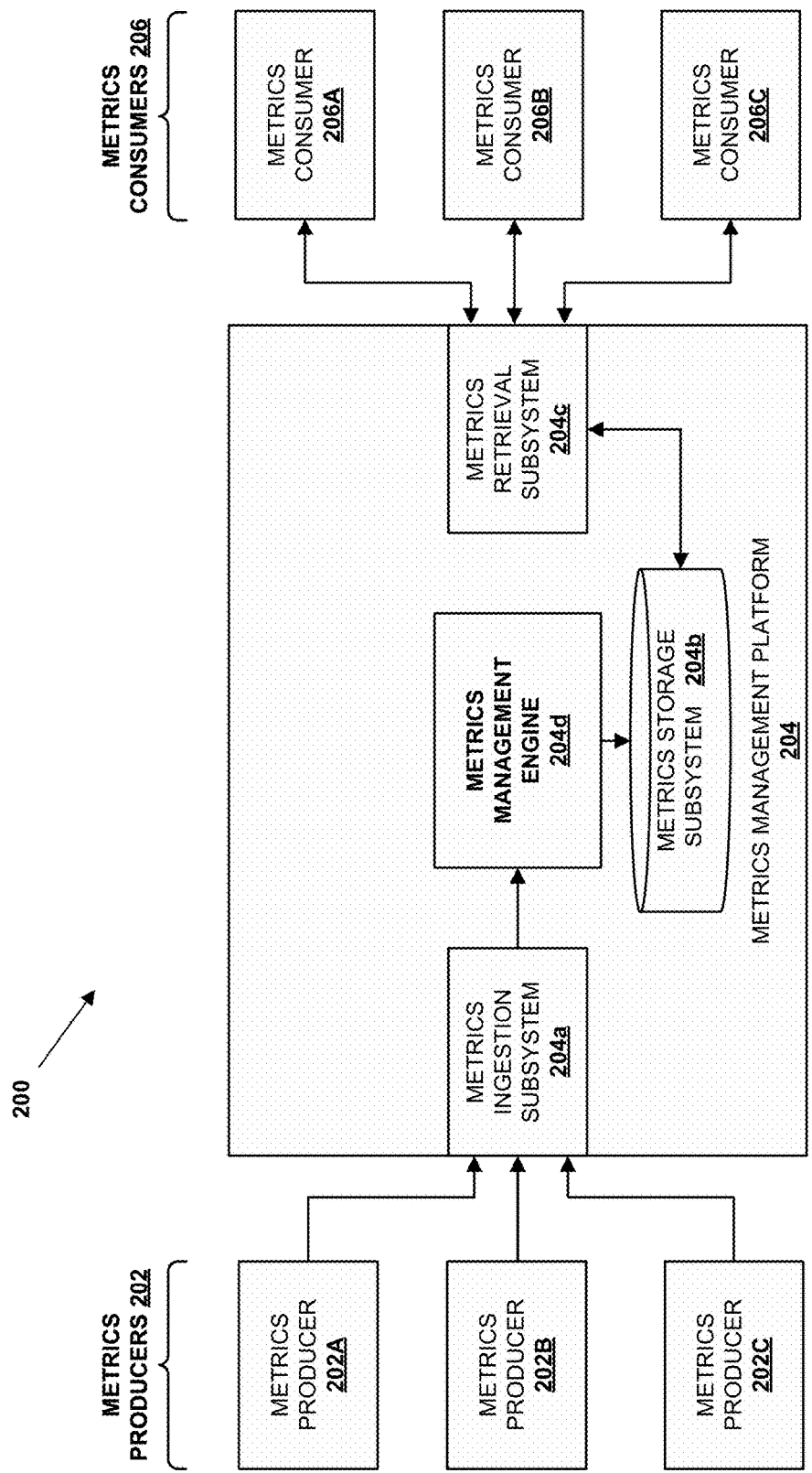
FIG. 2 illustrates a network environment in which the disclosed technology may be implemented.

Turning now to FIG. 2, a network environment 200 in which the disclosed technology may be implemented is illustrated. As with the network environment 100 of FIG. 1, the network environment 200 includes (i) a plurality of metrics producers 202, of which metrics producers 202A, 202B, and 202C are shown as examples, (ii) a metrics management platform 204 comprising a metrics ingestion subsystem 204a, a metrics storage subsystem 204b, and a metrics retrieval subsystem 204c, and (iii) a plurality of metrics consumers 206, of which metrics consumers 206A, 206B, and 206C are shown as examples. However, unlike the network environment 100 of FIG. 1, the network environment 200 of FIG. 2 further includes a metrics management engine 204d within the metrics management platform 204 that sits between the metrics ingestion subsystem 204a and the metrics storage subsystem 204b.

In accordance with the present disclosure, the metrics management engine 204d may be configured to carry out various functionality in order to facilitate intelligent management of metric data that is produced by the metrics producers 202.

For instance, according to one aspect, the metrics management engine 204d may be configured to engage in a "metric learning phase" during which the metrics management engine 204d performs some analysis of metric data that has previously been received from the metrics producers 202 in order to inform the future handling of metric data that is received from the metrics producers 202, where the results of such an analysis could be utilized by the metrics management engine 204d to automatically create new "metric handling rules" for handling metric data and/or could be presented to a user within an interface that facilitates the creation of new metric handling rules for handling metric data, among other possible ways that the results of such an analysis may be utilized. Details of the metric learning phase of the metrics management engine 204d will be described in greater depth below.

According to another aspect, the metrics management engine 204d may be configured to engage in a "metric handling phase" during which the metrics management engine 204d determines whether and to what extent metrics data received from the metrics producers 202 is to be stored in the metrics storage subsystem 204b, which may involve the application of certain metric handling rules that each defines a respective set of one or more platform-side handling actions that are to be taken on metric data for a respective set of one or more metrics (e.g., one particular metric identified by a name and a full set of labels, a grouping of metrics having the same name but not the same set of labels, etc.). The one or more platform-side handling actions that are defined by a metric handling rule could take any of various forms.

One possible platform-side handling action that may be defined by a given metric handling rule may comprise an action of blocking metric data for a given set of one or more metrics from being persistently stored in the metrics storage subsystem 204b, which may reduce the storage footprint of the given set of one or more metrics.

Another possible platform-side handling action that may be defined by a given metric handling rule may comprise an action of persistently storing metric data for a given set of one or more metrics in the metrics storage subsystem 204b in accordance with a given sampling rate for storing a reduced extent of metric data for the given set of one or more metrics. For example, if the metrics management engine 204d were operating in accordance with a metric handling rule that defines a handling action specifying a sampling rate of 10% for storage of metric data for a given metric, then the metrics management engine 204d may function to persistently store 10% of the received samples for the given metric (e.g., every $10^{th}$ sample of the metric) in the metrics storage subsystem 204b while discarding (or taking some other action such as storing in a lower tier) the other 90% of the received samples for the given metric. Other examples of storing metric data for a given set of one or more metrics in accordance with a given sampling rate may also exist.

Yet another possible platform-side handling action that may be defined by a given metric handling rule may comprise an action of storing metric data for a given set of one or more metrics in a given storage location within the metrics storage subsystem 204b that differs from a default storage location for storing received metric data within the metrics storage subsystem 204b. For instance, in an embodiment where the metrics storage subsystem 204b comprises a multi-tier storage architecture and the default storage location for storing received metric data is a highest storage tier of the multi-tier storage architecture (e.g., a "hot" tier), such a handling action may comprise an action of storing metric data for a given set of one or more metrics into a lower storage tier of the multi-tier storage architecture (e.g., a "cold" tier or "archive" tier). Or alternatively, in an embodiment where the metrics storage subsystem 204b comprises a multi-tier storage architecture and the default storage location for storing received metric data is a lowest storage tier of the multi-tier storage architecture (e.g., a "cold" tier), such a handling action may comprise an action of storing metric data for a given set of one or more metrics into a higher storage tier of the multi-tier storage architecture (e.g., a "hot" tier). In this respect, the storage of metrics into the different storage tiers may provide different benefits and drawbacks relative to one another-data stores in a higher storage tier may generally have characteristics better suited for storage of metrics that are more frequently accessed and/or considered to be of greater importance, such as data stores having a higher level of performance and/or a lower access cost but a higher storage cost, whereas data stores in a lower tier may generally have characteristics better suited for storage of metrics that are less frequently accessed and/or considered to be of lesser importance, such as data stores having a lower storage cost but a lower level of performance and/or a higher access cost. Other examples of storing metric data for a given set of one or more metrics a specified storage location may also exist, including but not limited to examples in which the specified storage location takes the form of a particular data store rather than a particular storage tier.

Still another possible platform-side handling action that may be defined by a given metric handling rule may comprise an action of storing metric data for a given set of one or more metrics in a compressed format, which may reduce the storage footprint of the metric. For example, such a handling action may involve removing or splitting certain portions of the metric data for a given metric prior to storage (e.g., known, fixed portions of the metric data that can be re-inserted later as needed and/or portions that are not critical to the analysis of the metric data later) and/or replacing certain portions of the metric data for the given metric (e.g., the metric's name and/or set of one or more labels) with reduced-size representations of such portions, such as reduced-size placeholder elements that allow the replaced portions of the metric data for the given metric to be re-inserted later as needed, among other possible ways of compressing the metric data for purposes of storage.

A further possible platform-side handling action that may be defined by a given metric handling rule may comprise a "conditional" version of one of the foregoing actions that is conditioned on some value included within the metric data for the given set of one or more metrics for which the given metric handling rule is defined. For instance, a given metric handling rule may define a set of one or more platform-side handling actions that are conditioned on how the received samples of a given metric compare to previously-received samples of the given metric. One representative example of such a metric handling rule may comprise a set of one or more platform-side handling actions that is conditioned on whether a received sample of a given metric is the same as the previously-received sample of the given metric, where the example metric handling rule dictates either (i) if the received sample of the given metric differs from the previously-received sample of the given metric, the received sample is to be handled by the metrics management engine 204d in accordance with its "default" handling behavior (e.g., by storing in a "default" storage location without any blocking, sampling, compression, or the like) or (ii) if the received sample of the given metric is the same as the previously-received sample of the given metric, one or more of the foregoing handling actions are to be carried out on the received sample (e.g., blocking, storing in a different storage location, compressing, etc.). Various other examples of conditional versions of platform-side handling actions may also exist.

The platform-side handling actions that may be defined by a given metric handling rule may take various other forms as well. Further, in line with the discussion above, a metric handling rule may define multiple different platform-side handling actions. To illustrate with a first example, a metric handling rule's defined set of platform-side handling actions could include actions of both (i) storing metric data for a given set of one or more metrics in accordance with a given sampling rate, and also (ii) storing the metric data for the given set of one or more metrics in a compressed format. To illustrate with a second example, a metric handling rule's defined set of platform-side handling actions could include actions of (i) storing metric data for a given set of one or more metrics in a first storage location (e.g., a lower storage tier), and also (ii) storing the metric data for the given set of one or more metrics in a second storage location (e.g., a higher storage tier) in accordance with a given sampling rate. Many other examples are possible as well.

When the metrics management engine 204*d* is configured to execute metric handling rules such as those described above, then whenever the metrics management engine 204*d* receives new metric data for a given metric, the metrics management engine 204*d* may function to evaluate whether it is configured with any metric handling rule for the given metric. If the metrics management engine's evaluation reveals that there is no metric handling rule for the given metric, then the metrics management engine 204*d* may handle the received metric data in accordance with its default handling behavior, which may be to store the received metric data into a default storage location within the metrics storage subsystem 204*b* without any blocking, sampling, compression, etc. (among other possible default handling actions). Alternatively, if the metrics management engine's evaluation reveals that there is a metric handling rule for the given metric, then the metrics management engine 204*d* may handle the received metric data in accordance with the metric handling rule (e.g., by blocking the received metric data from being persistently stored, storing the received metric data in accordance with a sampling rule, storing the received metric data in a different storage location, storing the received metric data in a compressed format, etc.).

In practice, the metric handling rules that are executed by the metrics management engine 204*d* may be created as a result of a metric learning phase, such as the one referenced above, or may alternatively be created in some other manner. For example, one or more of the metric handling rules could be pre-programmed into the metrics management engine 204*d* prior to its deployment if there already exists some universe of well-known metrics that are to be handled in a particular way, although the metrics management engine 204*d* may still have the capability to disable or modify such pre-programmed metric handling rules based on input from an admin user and/or subsequent analysis by the metrics management engine 204*d*.

Further, in some implementations, a metrics producer 202 may also be installed with a metrics management agent that is configured to engage in a metric handling phase during which the metrics management agent determines whether and to what extent metrics data produced by the metrics producer 202 is to be transmitted to the metrics management platform 204, which may involve the application of certain metric handling rules that each defines a respective set of one or more producer-side handling actions that are to be taken on metric data for a respective set of one or more metrics (e.g., one particular metric identified by a name and a full set of labels, a grouping of metrics having the same name but not the same set of labels, etc.). The one or more producer-side handling actions that are defined by a metric handling rule could take any of various forms.

One possible producer-side handling action that may be defined by a given metric handling rule may comprise an action of blocking metric data for a given set of one or more metrics being transmitted to the metrics management platform 204, which may reduce both the transmission footprint and the storage footprint of the given set of one or more metrics.

Another possible producer-side handling action that may be defined by a given metric handling rule may comprise an action of transmitting metric data for a given set of one or more metrics to the metrics management platform 204 in accordance with a given sampling rate for transmitting a reduced extent of metric data for the given set of one or more metrics. For example, if the metrics management agent installed at a given metrics producer 202 were operating in accordance with a metric handling rule that defines a handling action specifying a sampling rate of 10% for transmission of metric data for a given metric, then the metrics management agent installed at the given metrics producer 202 may cause the given metrics producer 202 to transmit 10% of produced samples for the given metric (e.g., every $10^{th}$ sample of the given metric) to the metrics management platform 204 while discarding (or taking some other action on) the other 90% of produced samples for the given metric. Other examples of transmitting metric data for a given set of one or more metrics in accordance with a given sampling rate may also exist.

Yet another possible producer-side handling action that may be defined by a given metric handling rule may comprise an action of transmitting metric data for a given set of one or more metrics to the metrics management platform 204 in a compressed format, which may reduce the transmission footprint of the metric. For example, such a handling action may involve removing or splitting certain portions of the metric data for a given metric prior to transmission (e.g., known, fixed portions of the metric data that can be re-inserted later as needed and/or portions that are not critical to the analysis of the metric data later) and/or replacing certain portions of the metric data for a given metric (e.g., the metric's name and/or set of one or more labels) with reduced-size representations of such portions, such as reduced-size placeholder elements that allow the replaced portions of the metric data for the given metric to be re-inserted later as needed, among other possible ways of compressing the metric data for purposes of transmission.

Still another possible producer-side handling action that may be defined by a given metric handling rule may comprise a "conditional" version of one of the foregoing actions that is conditioned on some value included within the metric data for the given set of one or more metrics for which the given metric handling rule is defined. For instance, a given metric handling rule may define a set of one or more producer-side handling actions that are conditioned on how the produced samples of a given metric compare to previously-produced samples of the given metric. One representative example of such a metric handling rule may comprise a set of one or more producer-side handling actions that is conditioned on whether a produced sample of a given metric is the same as the previously-produced sample of the given metric, where the example metric handling rule dictates either (i) if the produced sample of the given metric differs from the previously-produced sample of the given metric, the produced sample is to be handled by the metrics management agent in accordance with its "default" handling behavior (e.g., by transmitting the sample without any blocking, sampling, compression, or the like) or (ii) if the produced sample of the given metric is the same as the previously-produced sample of the given metric, one or more of the foregoing handling actions are to be carried out on the produced sample (e.g., blocking, compressing, etc.). Various other examples of conditional versions of producer-side handling actions may also exist.

The producer-side handling actions that may be defined by a given metric handling rule may take various other forms as well. Further, in line with the discussion above, a metric handling rule that may be executed by the metrics management agent of the given metrics producer 202 may define multiple different producer-side handling actions. To illustrate with an example, a metric handling rule's defined set of producer-side handling actions could include actions of both (i) transmitting metric data for a given set of one or more metrics to the metrics management platform 204 in accordance with a given sampling rate, and also (ii) transmitting the metric data for the given set of one or more metrics to the metrics management platform 204 in a compressed format. Many other examples are possible as well.

When the metrics management agent of a given metrics producer 202 is configured to execute metric handling rules such as those described above, then whenever new metric data is produced by the given metrics producer 202 for a given metric, the metrics management agent may function to evaluate whether it is configured with any metric handling rule for the given metric. If the metrics management agent's evaluation reveals that there is no metric handling rule for the given metric, then the metrics management agent may handle the produced metric data in accordance with its default handling behavior, which may be to transmit the metric to the metrics management platform 204 without any blocking, sampling, compression, etc. (among other possible default handling actions). Alternatively, if the metrics management agent's evaluation reveals that there is a metric handling rule for the given metric, then the metrics management agent may handle the produced metric data in accordance with the metric handling rule (e.g., by blocking the metric data from being transmitted, transmitting the metric data in accordance with a sampling rule, transmitting the metric data in a compressed format, etc.).

In practice, the metric handling rules that are executed by the metrics management agents installed at the metrics producers 202 may be created as a result of a metric learning phase of the metrics management engine 204d, such as the one referenced above, in which case the metrics management engine 204d may be configured to transmit the metric handling rules created as a result of the metric learning phase to the metrics producers 202 installed with metrics management agents so as to deploy such metric handling rules. Alternatively, the metric handling rules that are executed by the metrics management agents may be created in some other manner. For example, one or more of the metric handling rules could be pre-programmed into the metrics management agent prior to its deployment if there already exists some universe of well-known metrics that are to be handled in a particular way, although the metrics management agent may still have the capability to disable or modify such pre-programmed metric handling rules based on input from an admin user and/or subsequent analysis by the metrics management agent.

The metrics management engine 204d and/or the metrics management agents may be configured to carry out various other functionality as well.

Figure 3A:
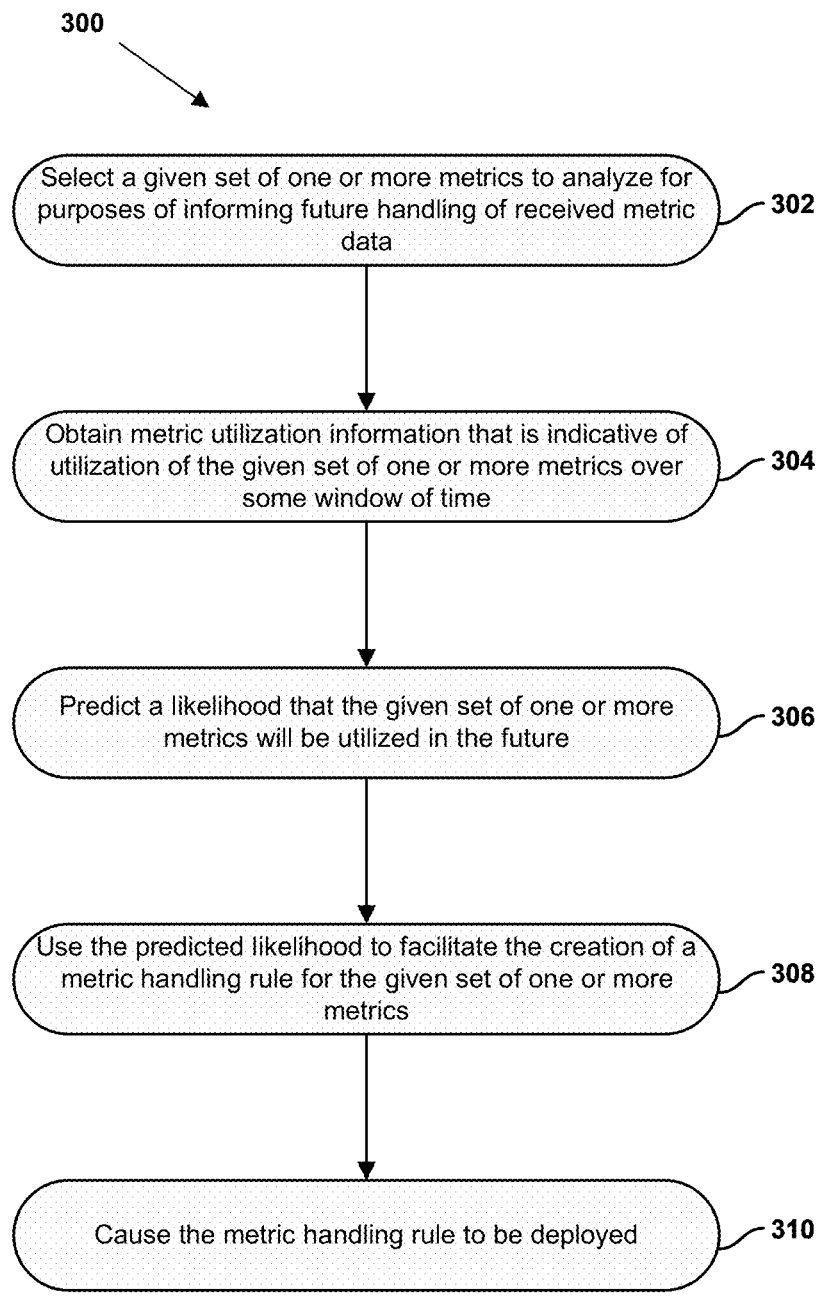
FIG. 3A illustrates a flow diagram showing one possible example of operations that may be performed as part of a metric learning phase in accordance with the present disclosure.

FIG. 3A illustrates a flowchart 300 showing one possible example of operations that may be performed by the metrics management engine 204d as part of an example metric learning phase during which the metrics management engine 204d performs some analysis of metric data that has previously been received from the metrics producers 202 in order to inform the future handling of metric data that is received from the metrics producers 202.

Starting at block 302, the metrics management engine 204d may select a given set of one or more metrics to analyze for the purpose of informing future handling of received metric data for the given set of one or more metrics. The given set of one or more metrics that is selected may take any of various forms.

As one possibility, the given set of one or more metrics may take the form of a single metric. For instance, in a scenario where metrics are each identified by (i) a metric name that identifies the general type of information that is represented by the metric and (ii) a set of one or more labels that identifies a specific instantiation of the metric name, the metrics management engine 204d may select a single metric for analysis that is identified by (i) a given metric name, and (ii) a full set of labels that identifies a specific instantiation of the metric name. To illustrate with one representative example, if the metrics management platform 204 has received metrics data for multiple different metrics having a metric name of http_requests_total and labels of type and host where each different combination of values for the type and host labels identifies a different discrete metric, the metrics management engine 204d may select an individual one of this family of different http_requests_total metrics—such as an http_requests_total metric having label values of type="400" and host "10.0.1.1" (which is typically represented as http_requests_total{type "400", host "10.0.1.1"}).

As another possibility, the given set of one or more metrics may take the form of a group of related metrics that share the same metric name and also share the same value for one or more labels, but do not share the same value for all of the labels. To illustrate with one representative example, if the metrics management platform 204 has received metrics data for multiple different metrics having a metric name of http_requests_total and labels of type and host where each different combination of values for the type and host labels identifies a different discrete metric, the metrics management engine 204d may select a particular subset of this family of different http_requests_total metrics that share the same value for one of the type and host labels but not the other—such as the particular subset of http_requests_total metrics having the label value type "400" (which is typically represented as http_requests_total{type "400"} across all of the different values of the host label. In such an example, a metric identified by the metric name http_requests_total and the labels type "400" and host "10.0.1.1" would be included in the given set of one or more metrics, as would other metrics with the same metric name of http_requests_total and the same label value of type="400".

As yet another possibility, the given set of one or more metrics may take the form of a group of related metrics that share the same metric name, regardless of the label values of the metrics To illustrate with one representative example, if the metrics management platform 204 has received metrics data for multiple different metrics having a metric name of http_requests_total and labels of type and host where each different combination of values for the type and host labels identifies a different discrete metric, the metrics management engine 204d may select the entire family of http_requests_total metrics across all of the different values of the type and host labels (which is typically represented as http_requests_total).

The given set of one or more metrics that is selected for analysis may take various other forms as well.

Further, while the operations of flow chart 300 are described herein in the context of one given set of one or more metrics that are selected for analysis, it will be understood that in practice, the metrics management engine 204d will carry out the operations of flow chart 300 for multiple different sets of one or more metrics. For instance, in an implementation where the metrics management platform 204d is configured to perform its analysis at an individual metric level, then the metrics management platform 204d may carry out the operations of flow chart 300 for every single individual metric for which metric data has been received by the metrics management platform 204, or at least for every single individual metric for which a sufficient amount of metric data has been received by the metrics management platform 204 (e.g., a statistically-significant amount of metric data). Alternatively, in an implementation where the metrics management platform 204d is configured to perform its analysis at grouped metric level, then the metrics management platform 204d may carry out the operations of flow chart 300 for every grouping of metrics for which metric data has been received by the metrics management platform 204, or at least for every grouping of metrics for which a sufficient amount of metric data has been received by the metrics management platform 204 (e.g., a statistically-significant amount of metric data).

At block 304, after selecting the given set of one or more metrics to analyze, the metrics management engine 204d may obtain information that is indicative of the utilization of the given set of one or more metrics over some window of time in the past (e.g., the past two weeks, the past month, etc.). As noted above, this information may be referred to herein as "metric utilization information," and the window of time in the past may be referred to herein as an "analysis window." The metric utilization information for the given set of one or more metrics that is obtained by the metrics management engine 204d may take any of various forms.

One possible category of metric utilization information for the given set of one or more metrics that is obtained by the metrics management engine 204d may take the form of information about the read activity that took place for the given set of one or more metrics during the analysis window, which may be referred to herein as "read activity information." The obtained read activity information for the given set of one or more metrics may take various forms, examples of which may include (i) an indication of the first time that metric data for the given set of one or more metrics was consumed by a metrics consumer 206 during the analysis window, (ii) an indication of the last time that metric data for the given set of one or more metrics was consumed by a metrics consumer 206 during the analysis window, (iii) an indication of how much time has passed since metric data for the given set of one or more metrics was last consumed by any metric consumer 206 during the analysis window (and/or an indication of whether a threshold amount time has passed since the last read request), and/or (iv) an indication of the extent of requests received during the analysis window that sought to read metric data for the given set of one or more metrics (e.g., an indication of the total number of requests received during the analysis window that were seeking to read metric data for the given set of one or more metrics and/or an indication of the rate of requests received during the analysis window that were seeking to read metric data for the given set of one or more metrics), among various other possible types of information about the read activity that took place for the given set of one or more metrics during the analysis window.

Further, in practice, the read activity information that is obtained by the metrics management engine 204d for the given set of one or more metrics may be determined based on other information that is maintained by (or otherwise available to) the metrics management platform 204.

For instance, as one possibility, the metrics management platform 204 may maintain certain information about read requests that are received by the metrics management platform 204, such as read request history data, and the metrics management engine 204d may determine the read activity information from the portion of the read request history data that corresponds to the analysis window. Such read request history data maintained by the metrics management platform 204 may take various forms. As one example, the read request history data may comprise a listing of read requests received by the metrics management platform 204 that includes information for each respective read request in the listing such as (i) an indication of the time that the respective read request was received by the metrics management platform 204 (e.g., a timestamp), (ii) an indication of the identity of the respective metrics consumer 206 that transmitted the respective read request, (iii) an identification of the metric(s) for which metric data was requested by the respective read request. (iv) an indication of whether any metric data was provided in response to the respective read request, and if so, an identification of what metric data was provided, and/or (v) other data fields that were included in the respective read request, among various other types of information that may be included in the read request history data. The read request history data may take various other forms as well.

In this implementation, the read activity information for the given set of one or more metrics may be determined from such read request history data in various ways, which may depend at least in part on the type of read activity information that is being determined for the given set of one or more metrics.

As one example, the metrics management engine 204d may determine an indication of the first time that metric data for the given set of one or more metrics was consumed by a metrics consumer 206 during the analysis window by (i) identifying the earliest read request for the given set of one or more metrics that falls within the analysis window and (ii) extracting the receipt time of that earliest read request.

As another example, the metrics management engine 204d may determine an indication of the last time that metric data for the given set of one or more metrics was consumed by a metrics consumer 206 during the analysis window by (i) identifying the latest read request for the given set of one or more metrics that falls within the analysis window and (ii) extracting the receipt time of that latest read request.

As yet another example, the metrics management engine 204d may determine an indication of how much time has passed since metric data for the given set of one or more metrics was last consumed by any metric consumer 206 during the analysis window by (i) identifying the latest read request for the given set of one or more metrics that falls within the analysis window, (ii) extracting the receipt time of that latest read request, and (iii) calculating a time difference between the extracted receipt time of that latest read request and the end of the analysis window.

As still another example, the metrics management engine 204*d* may determine information indicating the extent of read requests for the given set of one or more metrics by either (i) counting the total number of read requests for the given set of one or more metrics that were received by the metrics management platform 204 during the analysis window or (ii) determining the rate of read requests for the given set of one or more metrics received by the metrics management by dividing the total number of read requests for the given set of one or more metrics that were received over the course of the analysis window by the duration of the analysis window to determine a rate of read requests received per unit of time).

Other examples are possible as well.

Further yet, in practice, the read activity information for the given set of one or more metrics that is obtained by the metrics management engine 204*d* could either be determined by the metrics management engine 204*d* (or some other subsystem of the metrics management platform 204) at the time that it is obtained as part of the function of obtaining such information, or such read activity information could be regularly determined by the metrics management engine 204*d* (or some other subsystem of the metrics management platform 204) on a running basis as new read activity is detected by the metrics management engine 204*d* (e.g., the last read time for the given set of one or more metrics may be updated each time a new read request for the given set of one or more metrics is received), among other possible times that the read activity information for the given set of one or more metrics may be determined.

Another possible category of metric utilization information for the given set of one or more metrics that is obtained by the metrics management engine 204*d* may take the form of information about the write activity that took place for the given set of one or more metrics during the analysis window, which may be referred to herein as "write activity information." The obtained write activity information for the given set of one or more metrics may take various forms, examples of which may include (i) an indication of the first time that metric data for the given set of one or more metrics was written to the metrics storage subsystem 204*b* during the analysis window, (ii) an indication of the last time that metric data for the given set of one or more metrics was written to the metrics storage subsystem 204*b* during the analysis window, (iii) an indication of the extent of write activity of metric data for the given set of one or more metrics during the analysis window (e.g., an indication of the total number of samples of metric data for the given set of one or more metrics produced during the analysis window and/or an indication of the rate at which samples of metric data for the given set of one or more metrics were produced during the analysis window), and/or (iv) an indication of the "volatility" of the values of the given set of one or more metrics change (e.g., how frequently the values change and/or the range of values) over the course of the analysis window, among various other possible types of information about the write activity took place for the given set of one or more metrics during the analysis window.

Further, in practice, the write activity information that is obtained by the metrics management engine 204*d* for the given set of one or more metrics may be determined based on other information that is maintained by (or otherwise available to) the metrics management platform 204. For instance, as one possibility, the metrics management platform 204 may determine the write activity information from the portion of the previously-stored metric data for the given set of one or more metrics that corresponds to the analysis window.

In this implementation, the write activity information for the given set of one or more metrics may be determined from such previously-stored metric data in various ways, which may depend at least in part on the type of write activity information that is being determined for the given set of one or more metrics.

As one example, the metrics management engine 204*d* may determine an indication of the first time that a metric data sample for the given set of one or more metrics was written to the metrics storage subsystem 204*b* during the analysis window by (i) identifying the earliest written sample of the given set of one or more metrics that falls within the analysis window and (ii) extracting the write time of that earliest written sample.

As another example, the metrics management engine 204*d* may determine an indication of the last time that a metric data sample for the given set of one or more metrics was written to the metrics storage subsystem 204*b* during the analysis window by (i) identifying the latest written sample of the given set of one or more metrics that falls within the analysis window and (ii) extracting the write time of that latest written sample.

As yet another example, the metrics management engine 204*d* may determine information indicating the extent of write activity for the given set of one or more metrics by either (i) counting the total number of metric data samples for the given set of one or more metrics written to the metrics storage subsystem 204*b* during the analysis window or (ii) determining the rate at which the metric data samples for the given set of one or more metrics were written to the metrics storage subsystem 204*b* by dividing the total number of metric data samples for the given set of one or more metrics that were written to the metrics storage subsystem 204*b* during the analysis window by the duration of the analysis window to determine a rate of metric data samples written per unit of time).

As yet still another example, the metrics management engine 204*d* may determine an indication of the "volatility" of the values of the given set of one or more metrics change (e.g., how frequently the values change and/or the range of values) over the course of the analysis window by perform a volatility analysis of the values of the metric data samples for the given set of one or more metrics that were written to the metrics storage subsystem 204*b* during the analysis window.

Other examples are possible as well.

Further yet, in practice, the write activity information for the given set of one or more metrics that is obtained by the metrics management engine 204*d* could either be determined by the metrics management engine 204*d* (or some other subsystem of the metrics management platform 204) at the time that it is obtained as part of the function of obtaining such information, or such write activity information could be regularly determined by the metrics management engine 204*d* (or some other subsystem of the metrics management platform 204) on a running basis as new write activity is detected by the metrics management engine 204*d* (e.g., the last write time for the given set of one or more metrics may be updated each time a new sample of the given set of one or more metrics is written to storage), among other possible times that the write activity information for the given set of one or more metrics is determined.

Yet another possible category of metric utilization information for the given set of one or more metrics that is obtained by the metrics management engine 204d may take the form of information about the query activity for the given set of one or more metrics during the analysis window, which may be referred to herein as "query activity information." The obtained query activity information for the given set of one or more metrics may take various forms, examples of which may include (i) an indication of whether the given set of one or more metric was specified by any saved query in existence during the analysis window, (ii) an indication of the extent of query runs during the analysis window that sought to fetch metric data for the given set of one or more metrics (e.g., an indication of the total number of query runs received during the analysis window that were seeking to fetch metric data for the given set of one or more metrics and/or an indication of the rate of query runs received during the analysis window that were seeking to fetch metric data for the given set of one or more metrics), and/or (iii) an indication of the manner in metric data for the given set of one or more metrics was utilized by queries during the analysis window, such whether the queries utilized the metric data for the given set of one or more metrics in a dashboard, in an alert, or the like, among various other possible types of information that about the query activity for the given set of one or more metrics during the analysis window.

Further, in practice, the query activity information that is obtained by the metrics management engine 204d for the given set of one or more metrics may be determined based on various information that is available to the metric management platform 204. For instance, as one possibility, the metrics management platform 204 may have access to information about saved queries that encode requests for metric data, such as a listing of the saved queries that are set up at each of the metrics consumers 206 along with other information about the creation and/or run history of such saved queries, and the metrics management engine 204d may determine the query activity information from such information.

In this implementation, the query activity information for the given set of one or more metrics may be determined from such query data in various ways, which may depend at least in part on the type of query activity information that is being determined for the given set of one or more metrics.

As one example, the metrics management engine 204d may determine an indication of whether the given set of one or more metric was specified by any saved query in existence during the analysis window by evaluating the saved queries that were in existence during the analysis window to determine whether any saved query encoded a request to fetch metric data for the given set of one or more metrics.

As another example, the metrics management engine 204d may determine an indication of the extent of query runs during the analysis window that sought to fetch metric data for the given set of one or more metrics by either (i) counting the total number of query runs during the analysis window for any saved queries that include the given set of one or more metrics in their respective expression or (ii) determining the rate at which such queries were run during the analysis window by dividing the total number of query runs during the analysis window for any saved queries that include the given set of one or more metrics in their respective expression by the duration of the analysis window.

Other examples are possible as well.

Further yet, in practice, the query activity information for the given set of one or more metrics that is obtained by the metrics management engine 204d could either be determined by the metrics management engine 204d (or some other subsystem of the metrics management platform 204) at the time that it is obtained as part of the function of obtaining such information, or such query activity information could be regularly determined by the metrics management engine 204d (or some other subsystem of the metrics management platform 204) on a running basis as new query activity is detected by the metrics management engine 204d, among other possible times that the query activity information for the given set of one or more metrics is determined.

The metric utilization information for the given set of one or more metrics may take various other forms and/or may be obtained in various other ways as well. For example, the metric utilization information for the given set of one or more metrics could also comprise a type of metric utilization information that is determined based on a combination of read request history data and write request history data, such as an indication of whether metric data for the given set of one or more metrics meets the following two conditions: (i) at least one sample of the given set of one or more metrics has been written to the metric management platform's storage subsystem for at least a threshold period of time (e.g., 90 days) but (ii) no sample of the given set of one or more metrics has been read by a metric consumer. Many other examples are possible as well.

Along with obtaining the metric utilization information at block 304, other types of information about the given set of one or more metrics may be obtained as well, including but not limited to information about a predetermined "importance" level, a store cost level, and/or a cardinality level of the given set of one or more metrics, among other possible examples.

At block 306, based on the obtained metric utilization information, the metrics management engine 204d may predict a likelihood that the given set of one or more metrics will be utilized in the future. The metrics management engine 204d may carry out this function of predicting the likelihood that the given set of one or more metrics will be utilized in the future using logic that may take various forms.

For instance, as one possible implementation, this function of predicting the likelihood that the given set of one or more metrics will be utilized in the future may involve use of a trained machine learning model that is configured to (i) receive metric utilization information for a set of one or more metrics as input and (ii) based on an evaluation of the metric utilization information, output an indication of the likelihood that the given set of one or more metrics will be utilized in the future.

In such an implementation, the metric utilization information for the set of one or more metrics that is received as input by the trained machine learning model may comprise any of the various types of information described above, including but not limited to any of the example types of read activity information, write activity information, and/or query activity information discussed above, among other possible types of metric utilization information. Further, the indication of the likelihood that the given set of one or more metrics will be utilized in the future that is output by the trained machine learning model may take any of various forms, examples of which may include a numerical indicator of the likelihood that the given set of one or more metrics will be utilized in the future (e.g., a value of 0 to 1 or 0 to 100) or a categorical indicator of the likelihood that the given set of one or more metrics will be utilized in the future (e.g., a value selected from a set of two categorical indicators, such as "High" or "Low," or a value selected from a set of three or more categorical indicators). Further yet, the trained machine learning model may be produced prior to its use by applying a machine learning process to training data that takes the form of metric utilization information for historical metric data, where such a machine learning process may involve any of various machine learning techniques, examples of which may include a neural network technique (which is sometimes referred to as "deep learning"), a regression technique, a k-Nearest Neighbor (kNN) technique, a decision-tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. A machine learning model for predicting a likelihood that a given set of one or more metrics will be utilized in the future may take other forms as well.

As another possible implementation, this function of predicting the likelihood that the given set of one or more metrics will be utilized in the future may involve the use of a user-defined set of rules (sometimes referred to as a rules-based model) that is configured to (i) receive metric utilization information for a set of one or more metrics as input and (ii) based on rules-based evaluation of the metric utilization information, output an indication of the likelihood that the given set of one or more metrics will be utilized in the future.

In such an implementation, the metric utilization information for the set of one or more metrics that is received as input by the user-defined set of rules may comprise any of the various types of information described above, including but not limited to any of the example types of read activity information, write activity information, and/or query activity information discussed above, among other possible types of metric utilization information. Further, the indication of the likelihood that the given set of one or more metrics will be utilized in the future that is output by the trained machine learning model may take any of various forms, examples of which may include a numerical indicator of the likelihood that the given set of one or more metrics will be utilized in the future (e.g., a value of 0 to 1 or 0 to 100) or a categorical indicator of the likelihood that the given set of one or more metrics will be utilized in the future (e.g., a value selected from a set of two categorical indicators, such as "High" or "Low," or a value selected from a set of three or more categorical indicators). Further yet, the rules that are included in the user-defined set of rules may take various forms, one example of which may include a rule that compares a given type of metric utilization information to threshold value, and such rules may be combined together in any of various manners in order to produce the final output of the user-defined set of rules, one example of which may include a hierarchical arrangement of rules where the output of a rule at a higher level of the hierarchy dictates which rule is evaluated at a lower level of the hierarchy (if any). A user-defined set of rules for predicting a likelihood that a given set of one or more metrics will be utilized in the future may take other forms as well.

The logic that is employed by the metrics management engine 204d in order to carry out the function of predicting a likelihood that the given set of one or more metrics will be utilized in the future may take various other forms as well.

For instance, other examples of logic that could be employed by the metrics management engine 204d in order to carry out the function of predicting a likelihood that the given set of one or more metrics will be utilized in the future are described in U.S. application Ser. No. 17/410,873 entitled "Intelligently Generating and Deploying a Metric Blocklist within a Distributed Computing System to Efficiently Manage Data Metric Requests," which is incorporated herein by reference in its entirety.

As one representative example to illustrate, the logic employed by the metrics management engine 204d could take the form of a machine learning model or a set of user-defined rules that is configured to receive at least two types of metric utilization information: (i) an indication of whether or not the given set of one or more metrics was specified by any saved query in existence during the analysis window and (ii) some indication of whether there has been recent read activity for the given set of one or more metrics, such as an indication of how much time has passed since metric data for the given set of one or more metrics was last read by any metric consumer 206 and/or an indication of whether metric data for the given set of one or more metrics was stored for at least a threshold amount of time (e.g., at least 90 days) but was never read during the analysis window. In this respect, the logic may predict a high likelihood of being utilized if the given set of one or more metrics was specified by at least one saved query in existence during the analysis window, a medium likelihood of being utilized if the given set of one or more metrics was not specified by at least one saved query in existence during the analysis window but metric data for the given set of one or more metrics was read at least once during the analysis window, and a low likelihood if the given set of one or more metrics was not specified by at least one saved query in existence during the analysis window and metric data for the given set of one or more metrics was also not read at least once during the analysis window. Many other examples are possible as well.

At block 308, the metrics management engine 204d may use the predicted likelihood that the given set of one or more metrics will be utilized in the future to facilitate the creation of a metric handling rule for the given set of one or more metrics. In line with the discussion above, such a metric handling rule may comprise (i) an identification of the given set of one or more metrics to which the metric handling rule applies (e.g., a metric identifier including a metric name and optionally one or more label values) and (ii) a set of one or more platform-side handling actions that are to be applied to ingested metric data for the given set of one or more metrics going forward. Further, in line with the discussion above, the set of one or more platform-side handling actions that are specified by the metric handling rule may take various forms, examples of which may include (i) blocking metric data for the given set of one or more metrics from being persistently stored in the metrics storage subsystem 204b, (ii) storing metric data for the given set of one or more metrics in the metrics storage subsystem 204b in accordance with a given sampling rate, (iii) storing metric data for the given set of one or more metrics in a given storage location within the metrics storage subsystem 204b that differs from a default storage location for storing received metrics, or (iv) storing metric data for the given set of one or more metrics in a compressed format, among various other handling actions.

As a first possible embodiment of this functionality, the metrics management engine 204d may use the predicted likelihood of the given set of one or more metrics being utilized in the future to automatically create a metric handling rule for the given set of one or more metrics. This first implementation may take various forms.

In one implementation of this first embodiment, the metrics management engine 204d may begin by using the predicted likelihood of the given set of one or more metrics being utilized in the future as a basis for making a threshold determination of whether to create a metric handling rule that will cause metric data for the given set of one or more metrics to be handled in a different manner than the default handling scheme for metric data. In this respect, if the default handling scheme for metric data is to store metric data in a higher storage tier without performing any action to reduce the storage footprint of the metric data (e.g., no blocking, sampling, compression, etc.), then the metrics management engine 204d may be configured to either (i) forgo the creation of a metric handling rule for the given set of one or more metrics if the metrics management engine 204d predicted a higher likelihood of the given set of one or more metrics being utilized in the future (e.g., a numerical value indicating a likelihood of greater than 50%, a categorical value of "high," or the like) or (ii) proceed with the creation of a metric handling rule for the given set of one or more metrics if the metrics management engine 204d predicted a lower likelihood of the given set of one or more metrics being utilized in the future (e.g., a numerical value indicating a likelihood of less than 50%, a categorical value of "lower," or the like).

If the metrics management engine 204d determines that the predicted likelihood of the given set of one or more metrics being utilized in the future warrants the creation of a metric handling rule for the given set of one or more metrics, the metrics management engine 204d may then automatically select one or more platform-side handling actions to include in the metric handling rule. This function of automatically selecting the one or more platform-side handling actions to include in the metric handling rule may take various forms.

According to one possibility, the metrics management engine 204d may be configured to select the same given set of one or more platform-side handling actions to include in each new metric handling rule that is created, such that whenever metrics management engine 204d determines that the utilization likelihood predicted for a set of one or more metrics warrants creation of a new metric handling rule, the metrics management engine 204d automatically creates a new metric handling rule that includes the given set of one or more platform-side handling actions. For example, if the metrics management engine 204d is configured to select and include a platform-side handling action of storing metric data into a lower storage tier for each new metric handling rule that is created, then the function of automatically selecting the one or more platform-side handling actions to include in the metric handling rule for the given set of one or more metrics may involve automatically selecting the platform-side handling action of storing metric data into a lower storage tier to include in the metric handling rule for the given set of one or more metrics. Along similar lines, the metrics management engine 204d may be configured to select and include other types of platform-side handling actions for each new metric handling rule that is created, such as blocking, sampling, compressing, or the like.

According to another possibility, the metrics management engine 204d may be configured to use the predicted likelihood of the given set of one or more metrics being utilized in the future as a basis for determining the set of one or more handling actions to include in the metric handling rule for the given set of one or more metrics. For instance, the metrics management engine 204d may be configured to maintain a mapping (or the like) between possible utilization likelihood values that can be predicted at block 306 and handling actions that are to be taken, in which case the metrics management engine 204d may function to lookup the predicted likelihood of the given set of one or more metrics being utilized in the future within the mapping and then determine the corresponding handling action(s) that are to be included in the metric handling rule. To illustrate with an example, the metrics management engine 204d may be configured to maintain a mapping in which a lower utilization likelihood value corresponds to a handling action such as blocking metric data from persistent storage and/or storing metric data in a lower storage tier, whereas a higher utilization likelihood value corresponds to a handling action such as sampling or compressing the metric data (while continuing to store the metric data in a higher storage tier within the metrics storage subsystem 204b), among various other possibilities.

While this implementation of the first embodiment is described above in the context of a scenario where the default handling scheme for metric data is to store metric data in a higher tier of data storage without performing any action to reduce the storage footprint of the metric data (e.g., no blocking, sampling, compression, etc.), it should be understood that this implementation of the first embodiment may also apply to a scenario where the default handling scheme for metric data is to store metric data in a lower tier of data storage and/or to perform an action to reduce the storage footprint of the metric data (e.g., blocking, sampling, compression, etc.). In this alternate scenario, the metrics management engine 204d may be configured to either (i) proceed with the creation of a metric handling rule for the given set of one or more metrics if the metrics management engine 204d predicted a higher likelihood that the given set of one or more metrics will be utilized in the future (e.g., a numerical value indicating a likelihood of greater than 50%, a categorical value of "high," or the like) or (ii) forgo the creation of a metric handling rule for the given set of one or more metrics if the metrics management engine 204d predicted a lower likelihood that the given set of one or more metrics will be utilized in the future (e.g., a numerical value indicating a likelihood of less than 50%, a categorical value of "lower," or the like).

Further, in this alternate scenario, the set of one or more platform-side handling actions that are automatically selected by the metric management engine 204d to include in a metric handling rule when there is a higher likelihood that the given set of one or more metrics will be utilized in the future may comprise an action of storing the metric data in a higher storage tier (rather than the lower storage tier that is used by default), among other possible platform-side handling actions that could be selected in this scenario.

In another implementation of the first embodiment, instead of making a threshold determination of whether to create a metric handling rule that will cause metric data for the given set of one or more metrics to be handled in a different manner than the default handling scheme for metric data, the metric management engine 204d may be configured to create a new metric handling rule for each set of one or more metrics that it analyzes, in which case the metrics management engine 204d may use the predicted likelihood of the given set of one or more metrics being utilized in the future as a basis for determining the set of one or more handling actions to include in the metric handling rule for the given set of one or more metrics. For instance, along similar lines to the above description, the metrics management engine 204d may be configured to maintain a mapping (or the like) between possible utilization likelihood values that can be predicted at block 306 and handling actions that are to be taken, in which case the metrics management engine 204d may function to lookup the predicted likelihood of the given set of one or more metrics being utilized in the future within the mapping and then determine the corresponding handling action(s) that are to be included in the metric handling rule. To illustrate with an example, the metrics management engine 204d may be configured to maintain a mapping in which a lower utilization likelihood value corresponds to a handling action such as blocking metric data from persistent storage and/or storing metric data in a lower storage tier (either with or without sampling, compression, or the like), whereas a higher utilization likelihood value corresponds to a handling action such as storing metric data in a higher storage tier, among various other possibilities.

This first embodiment of how the metrics management engine 204d may use the predicted likelihood of the given set of one or more metrics being utilized in the future to facilitate the creation of a metric handling rule for the given set of one or more metrics may take various other forms as well.

FIG. 3B illustrates the first possible embodiment of the functionality of block 308, in accordance with the present disclosure. Specifically, FIG. 3B shows one possible example of a number of metrics, each of which the metrics management engine 204d has automatically created a metric handling rule for.

As shown, FIG. 3B includes a first metric with a metric identifier node_memory_usage_bytes {app "app_1"}, a second metric with a metric identifier node_memory_usage_bytes {app "app_2"}, and a third metric with a metric identifier http_request_total that each may be selected by the metrics management engine 204d, such as described with respect to the block 302. After obtaining the metric utilization information for each of the of metrics shown, for example as described with respect to the block 304, the metrics management engine 204d may predict a likelihood that each of the metrics will be utilized in the future, for example as described with respect to the block 306. As shown, metrics management engine 204d predicted a 25% utilization likelihood for the first metric, a 45% utilization likelihood for the second metric, and a 90% utilization likelihood for the third metric.

The metrics management engine 204d may then use the predicted utilization likelihood for each metric to determine if a metric handling rule should be created for the metric, and if so, to automatically create a metric handling rule for the metric. As shown, the metrics management engine 204d may use the utilization likelihood "25%" for the first metric as a basis for determining that a metric handling rule should be created for the first metric, and may then automatically create a metric handling rule with a handling action of "Store in Lower Storage Tier" and a second handling action of "Sample" for the first metric, which handling actions may include storing metric data for the metric at a given storage sampling rate in a lower tier of storage (e.g., lower than a default tier of storage). Further, as shown, the metrics management engine 204d may use the utilization likelihood "45%" for the second metric as a basis for determining that a metric handling rule should be created for the second metric, and may then automatically create a metric handling rule with a handling action of "Store in Lower Storage Tier" for the second metric, which handling action may include storing metric data for the second metric in a lower tier of storage (e.g., lower than a default tier of storage). Further yet, as shown, the metrics management engine 204d may use the utilization likelihood "90%" for the third metric as a basis for determining that a metric handling rule should not be created for the third metric 204d, and may instead handle metric data for the third metric according to its default handling behavior. The metrics management engine 204d could automatically create various other metric handling rules as well.

As a second possible embodiment of the functionality of the block 308, instead of using the predicted likelihood of the given set of one or more metrics being utilized in the future to automatically create a metric handling rule for the given set of one or more metrics, the metrics management engine 204d may cause the predicted likelihood of the given set of one or more metrics being utilized in the future to be presented to a user of the metrics management platform 204 via a client device associated with the user, and more particularly via a graphical user interface (GUI) displayed on the client device that facilitates creation of new metric handling rules for metrics that are being stored by the metrics management platform 204.

In this respect, the GUI may present identifying information for the given set of one or more metrics that was analyzed by the metrics management engine 204d (e.g., a metric name and perhaps also one or more label values, if applicable) along with a corresponding indication of the predicted likelihood that the given set of one or more metrics will be utilized in the future, which as noted above may take the form of a numerical indicator (e.g., a value between 0 and 1 or between 0 and 100) and/or a categorical indicator (e.g., a "high" or "low" indicator), among other possibilities. Further, as previously discussed, the metrics management engine 204d may perform the operations described in the flowchart 300 in order to analyze multiple different sets of one or more metrics, in which case the GUI may present identifying information and predicted likelihood indications for the multiple different sets of one or more metrics that are analyzed by the metrics management engine 204d in the form of a list (or the like). In this respect, the information that is presented for the multiple different sets of one or more metrics may be sorted according to the utilization likelihood values that are predicted for the different sets of one or more metrics, such that sets of one or more metrics with lower utilization likelihood values are presented at the top of the list and sets of one or more metrics with higher utilization likelihood values are presented at the bottom of the list.

Along with presenting the listing of identifying information and predicted likelihood indications for the sets of one or more metrics, the GUI may also enable a user to create a new metric handling rule for each set of one or more metric presented within the GUI. For example, the GUI may present a user with the ability to (i) access a listing of available handling actions that could be implemented for a given set of one or more metrics that is presented via the GUI (e.g., via a selectable dropdown menu), and then (ii) select one or more of the handling actions from the listing, which may then cause a new metric handling rule to be created for the given set of one or more metrics that includes the selected one or more handling actions.

In line with the discussion above, the listing of available handling actions may include any of various different types of handling actions previously described, including but not limited to (i) blocking metric data for the given set of one or more metrics from being persistently stored in the metrics storage subsystem 204b, (ii) storing metric data for the given set of one or more metrics in the metrics storage subsystem 204b in accordance with a given sampling rate, (iii) storing metric data for the given set of one or more metrics in a given storage location within the metrics storage subsystem 204b that differs from a default storage location for storing received metrics, or (iv) storing metric data for the given set of one or more metrics in a compressed format, among various other handling actions.

In at least some implementations, along with presenting the user with a listing of possible handling actions, the GUI could additionally present the user with other information that assists the user in the task of creating metric handling rules. For instance, as one possibility, the GUI could additionally present the user with recommendations for which handling actions to select for certain sets of one or more metrics, such as by including a "recommended" indicator (e.g., an asterisk) next to the handling action(s) within the listing of available handling actions that are recommended. As another possibility, the GUI may present a user with a listing of pre-created metric handling rules that are recommended by the metrics management engine 204d and enable the user to select one or more of those recommended metric handling rules, which may then cause one or more new metric handling rules to be created. As yet another possibility, the GUI could additionally present the user with information regarding the cost impact of implementing the different handling actions for a given set of one or more metrics, such as an indication of a predicted cost savings that could be achieved by creating and deploying a metric handling rule comprising each of the different handling actions (e.g., a first predicted cost savings if a "discard" action is selected for a given set of one or more metrics, a second predicted savings if a "store in a different storage location" action is selected for a given set of one or more metrics, and so on). The GUI could present the user with other information that assists the user in the task of creating metric handling rules as well.

Further, there may be various other ways in which the GUI may enable a user to create one or more new metric handling rules for metrics.

Figure 3C:
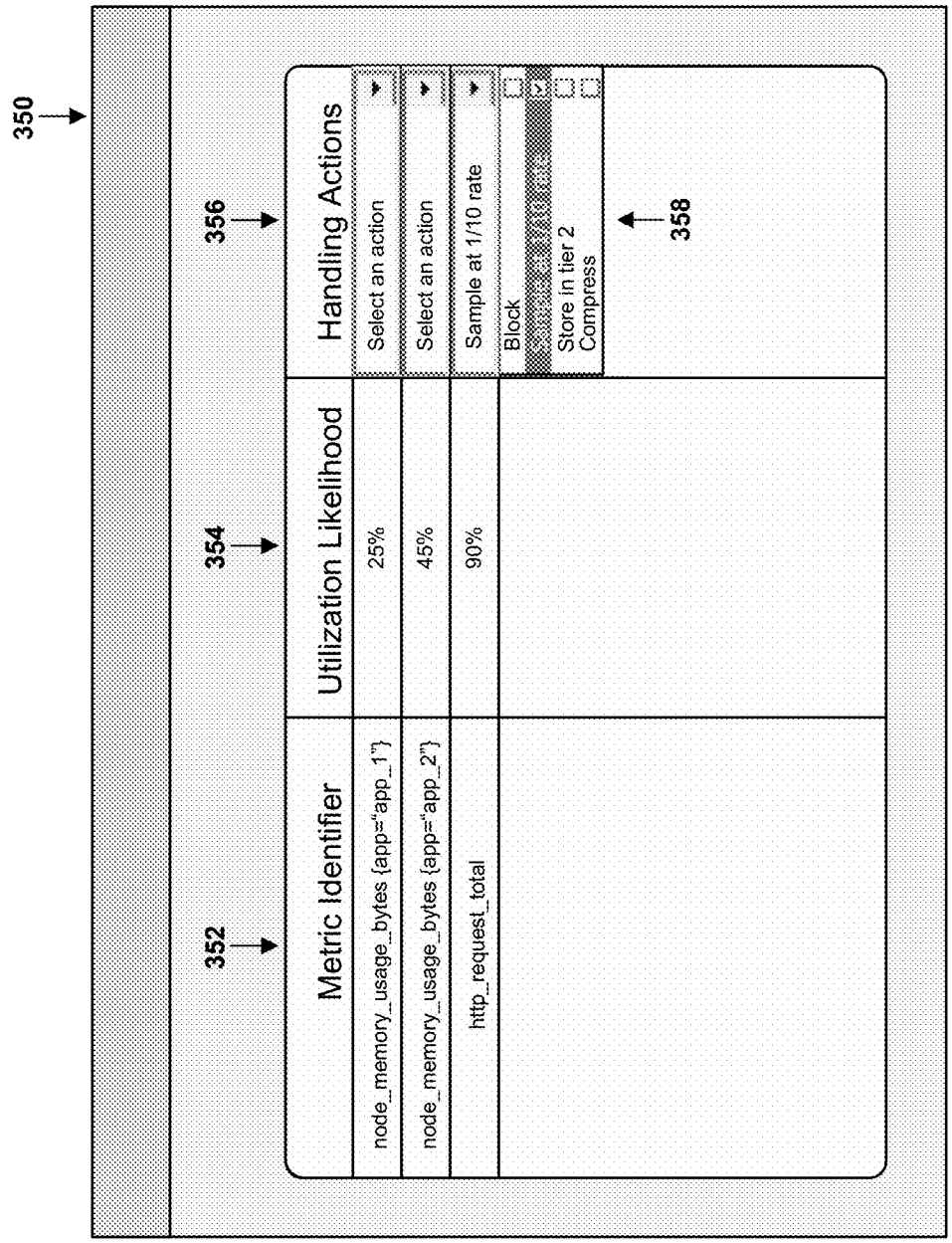
FIG. 3C illustrates a second possible embodiment of how a predicted likelihood of a given set of one or more metrics being utilized in the future may be used to facilitate the creation of a metric handling rule for the given set of one or more metrics.

FIG. 3C illustrates the second possible embodiment of the functionality of block 308, in accordance with the present disclosure. Specifically, FIG. 3C shows one possible example of a GUI 350 that may facilitate the creation of new metric handling rules for sets of metrics, in accordance with the present disclosure.

The GUI 350 may be provided to users of the metrics management platform 204 as part of the metric learning phase of the metrics management engine 204d and may be based on an analysis performed by the metrics management engine 204d on the metrics obtained by the metrics management engine 204d as part of said metric learning phase.

In general, the GUI 350 serves to present the predicted likelihood of a given set of one or more metrics being utilized in the future, to a user of the metrics management platform 204 via a client device associated with the user, and more particularly via a GUI displayed on the client device that facilitates creation of new metric handling rules for metrics that are being stored by the metrics management platform 204, so as to allow the user to make a determination on whether to create a new metric handling rule for the given set of one or more metrics, as well as to provide the user with an interactive display that enables the user to (i) access a listing of available handling actions that could be implemented for the given set of one or more metrics, and then (ii) select one or more of the handling actions from the listing, which may then cause a new metric handling rule to be created for the given set of one or more metrics that comprises the selected one or more handling actions.

As shown in FIG. 3C, the GUI 350 includes (i) a first column 352 labeled "Metric Identifier" that displays identifying information for multiple different sets of one or more metrics that are analyzed by the metrics management engine 204d in the form of a list of metric identifiers, and (ii) a second column 354 labeled "Utilization Likelihood" that displays an indication of the predicted likelihood that each of the different sets of one or more metrics will be utilized in the future, as may be determined by either a trained machine learning model or a rules-based model, as previously described.

As further shown in FIG. 3C, the GUI 350 includes a third column 356 labeled "Handling Actions" that displays a dropdown menu for each of the metric identifiers displayed in the first column 352 to allow users to select between various handling actions that may be included in a new metric handling rule for the set of one or more metrics identified by the metric identifier, of which dropdown menu 358 is shown as a specific example. In practice, before a user selects a handling action, the dropdown menu 358 for a given metric identifier may include the text "Select an action" to prompt the user to utilize the dropdown menu 358 to select between the various handling actions presented therein, which are shown to include handling actions such as blocking metric data of the set of one or more metrics, storing metric data of the set of one or more metrics according to a 10% sampling rate, storing metric data of the set of one or more metrics in a different storage tier (e.g., in tier 2), and storing the metric data of the set of one or more metrics in a compressed format, among various other possible handling actions.

Thus, as shown in FIG. 3C, each row of the GUI 350 may display information for a respective set of one or more metrics analyzed by the metrics management engine 204d that includes (i) a respective metric identifier identifying the respective set of one or more metrics, (ii) an indication of the predicted likelihood that metric data for the respective set of one or more metrics will be utilized in the future, and (iii) an indication of what handling actions may be included in a new metric handling rule for the respective set of one or more metrics.

Although not shown, in line with the discussion above, the GUI 350 could also present other information that assists the user in the task of creating metric handling rules. For instance, as one possibility, the GUI 350 could additionally present recommendations for which handling actions to select for certain sets of one or more metrics, such as by including a "recommended" indicator (e.g., an asterisk) next to the handling actions within the listing available handling actions that are recommended. As another possibility, the GUI 350 could present a listing of pre-created metric handling rules that are recommended by the metrics management engine 204d and enable the user to select one or more of those recommended metric handling rules, which may then cause one or more new metric handling rules to be created. As yet another possibility, the GUI 350 could additionally present information regarding the cost impact of implementing the different handling actions for a given set of one or more metrics, such as an indication of a predicted cost savings that could be achieved by creating and deploying a metric handling rule comprising each of the different handling actions shown in the dropdown menu. The GUI could present the user with other information that assists the user in the task of creating metric handling rules as well.

Turning to block 310, after facilitating the creation of the metric handling rule for the given set of one or more metrics, the metrics management engine 204d may then cause the metric handling rule to be deployed. For instance, if a new metric handling rule involving a set of one or more platform-side handling actions is to be deployed by the metrics management engine 204d, then the metrics management engine 204d may provision itself to begin executing the new metric handling rule, which may involve updating the metrics management engine's existing set of metric handling rules to include the new metric handling rule or, if the metrics management engine 204d is already provisioned with a metric handling rule for the given set of one or more metrics, then the metrics management engine 204d may replace the current metric handling rule with the new, updated metric handling rule. Alternatively, if a new identity-based handling rule involving a set of one or more producer-side handling actions is to be deployed by metrics management agents installed at the metrics producers 202, then the metrics management engine 204d may instruct each of the metrics management agents to update its existing set of metric handling rules to include the new metric handling rule, or, if the metrics management agent is already provisioned with a metric handling rule for the given set of one or more metrics, then the metrics management agent may replace the current metric handling rule with the new, updated metric handling rule). The function of causing the new metric handling rule created at block 308 to be deployed may take various other forms as well.

In with the discussion above, the metrics management engine 204d may carry out the foregoing functionality for any of various different sets of one or more metrics, and for a given set of one or more metrics, the metrics management engine 204d may repeat the foregoing functionality multiple different times in order to adapt the metric handling rule for the given set of one or more metrics to the current utilization of the given set of one or more metrics.

Further, there may be scenarios where the given set of one or more metrics analyzed by the metrics management engine 204d during its metric learning phase does not have sufficient activity information associated with it (e.g., read activity information, write activity information, or query activity information) to determine reliable metric utilization information for the given set of one or more metrics. The metrics management engine 204d may be configured to address these scenarios in various ways.

As one possibility, the metrics management engine 204d may be configured to perform a sequence of actions to cause the metric learning phase to be carried out at a future point in time when adequate activity information is available for determining metric utilization information for the given set of one or more metrics. One action that may be performed by the metrics management engine 204d when an inadequate amount of activity information is available during the analysis window may be to handle the given set of one or more metrics according to default handling actions, perhaps until enough activity information is available in a subsequent run of the metric learning phase for the given set of one or more metrics. Another action that may be performed by the metrics management engine 204d when some activity information of the given set of one or more metrics is observed, either during an analysis window in the past or contemporaneously, may be to cause the metric learning phase for the given set of one or more metrics to be rerun after a given period of time (e.g., 1 day, 1 week, 1 month, etc.) in the hopes that more activity information for the given set of one or more metrics will be available during an analysis window of said future rerun of the metric learning phase. Other actions are also possible.

As another possibility, the metrics management engine 204d may be configured to perform a similarity analysis between the given set of one or more metrics and other sets of metrics that have previously been analyzed by the metrics management engine 204d during a metric learning phase to determine whether the given set of one or more metrics meets a threshold level of similarity to any of the other sets of metrics. In the event that the given set of one or more metrics meets the threshold level of similarity to another set of one or more metrics, then the metrics management engine 204d may create a metric handling rule for the given set of one or more metrics that includes some or all of the same handling actions included the metric handling rule for the other set of one or more metrics.

The similarity analysis that the metrics management engine 204d may perform may consider various factors in determining whether the given set of one or more metrics meets a threshold level of similarity to any of the other sets of metrics previously analyzed by the metrics management engine 204d. One factor may include how similar the metric identifier of the given set of one or more metrics is to the metric identifiers of other sets of metrics. Another factor may include how likely the metric identifier of the given set of one or more metrics and the metric identifiers of other sets of metrics are to have activity information that may be used to determine metric utilization information resulting in similar predictions of future utility. For example, a metric identifier with a label type="200" and another metric identifier with a label type="400" may, although appearing similar in label name, have different activity information that may be used to determine metric utilization information resulting in different predictions of future utility, whereas a metric identifier with a label host="h1" and another metric identifier with a label host="h2" may have activity information that may be used to determine metric utilization information resulting in similar likelihoods of future utility. Various other factors may also exist.

The metric learning phase described in the FIG. 3A may take any of various other forms, including the addition of certain blocks representing further operations that may be included in the metric learning phase of the metrics management engine 204d, as well as the removal of one or more of the blocks 302-310 of FIG. 3A. Further, the metric learning phase described in FIG. 3A may be triggered at any of various times, such as during an initial setup phase of the metrics management engine 204d, or according to some cadence (e.g., every n days, after the receipt of x amount of activity information, after the creation or revision of a query saved at an alert engine or dashboard engine, after the receipt of new activity information that does belong to any set of one or more metrics for which a metric handling rule exists, etc.), among various other possibilities. Further yet, while the learning phase has been described in terms of creating a handling rule with platform-side handling actions, the metrics management engine 204d may perform similar functionality for creating a rule that defines a set of one or more producer-side handling actions.

While the foregoing describes an example metric learning phase during which a metric handling rule for a given set of one or more metrics is a created based on a predicted utilization of metric data for the given set of one or more metrics, it should be understood that a metric handling rule could be created based on other factors beyond predicted utilization as well.

For instance, in one alternate embodiment, the metric management engine 204d may be configured to assign a predicted value (i.e., a "score") to the given set of one or more metrics that is based on other factors beyond the predicted utilization of metric data for the given set of one or more metrics, examples of which may include an predetermined "importance" level of the given set of one or more metrics (e.g., a value indicating a predetermined importance of the given set of one or more metrics to metrics consumers 206), a storage cost level of the given set of one or more metrics (e.g., a value indicating how much storage is required to store each sample of the given set of one or more metrics), and/or a cardinality level of the given set of one or more metrics, among other possibilities. In this respect, the prediction at block 306 may produce a prediction value that is based on not only the predicted utilization of metric data for the given set of one or more metrics, but also one or more of these other factors. And in turn, the metric handling rule that is created and deployed at blocks 308-310 may be based not only the predicted utilization of metric data for the given set of one or more metrics, but also one or more of these other factors. To facilitate this functionality, the logic employed at block 306 to produce the prediction (e.g., a machine learning model, set of user-defined rules, or the like) may be configured to receive other types of information as input beyond the metric utilization information described above, such as information regarding the importance, storage cost, and/or cardinality level of the given set of one or more metrics, in which case the predicted value output by such logic may already incorporate these other factors, or alternatively, the metric management engine 204d may be configured with additional logic that functions to combine the likelihood value output by the logic described above with other factors in order to produce a new predicted value for the given set of one or more metrics that incorporates these other factors.

The functionality that may be carried out by the metrics management engine 204d in order to analyze metric data for purposes of intelligently handling metric data in the future may take various other forms as well. For instance, other example functionality that could be carried out by the metrics management engine 204d in order to predict the utilization of metric data for a given metric and then deploy logic for intelligently handling ingested metric data for the given metric in accordance with the predicted utilization is described in U.S. application Ser. No. 17/410,873 entitled "Intelligently Generating and Deploying a Metric Blocklist within a Distributed Computing System to Efficiently Manage Data Metric Requests," which is incorporated herein by reference in its entirety.

Figure 4:
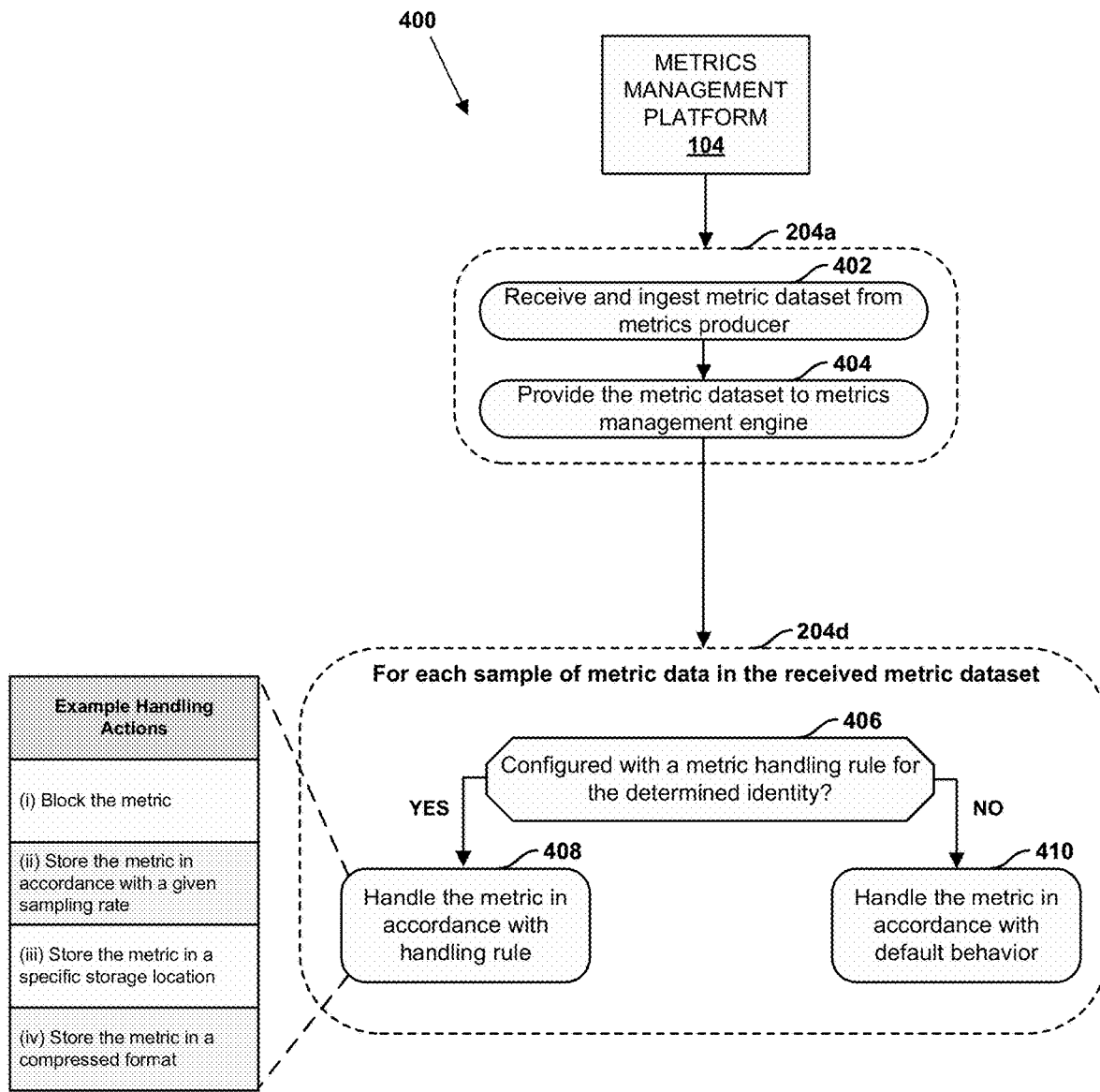
FIG. 4 illustrates a flow diagram of an example use case where metric handling phase functionality is carried out by a metrics management engine, in accordance with the present disclosure.

As previously discussed, the metrics management engine 204d may further be configured to engage in a metric handling phase, which as noted above involves executing certain metric handling rules for handling metric data received by the metrics management platform 204, where each such metric handling rule defines a given set of one or more handling actions that are to be taken on metric data for a given set of one or more metrics. FIG. 4 illustrates a flow diagram 400 of an example use case where the disclosed metric handling phase functionality is carried out by the metrics management engine 204d, in accordance with the present disclosure.

As shown in FIG. 4, this example use case may begin at block 402 with the metrics ingestion subsystem 204a of the metrics management platform 204 receiving and ingesting a metric dataset from a given metrics producer 202, such as the metrics producer 202A. In line with the discussion above, the metrics producer 202A may take any of various forms, examples of which may include a client device installed with a client application that is configured to produce and transmit metric data (e.g., a mobile application, desktop application, web application, etc.) or a server installed with a server application that is configured to produce and transmit metric data (e.g., a back-end service such as a microservice), among other possibilities. Further, the metrics producer 202A may transmit the metric dataset to the metrics management platform 204 at various different times. For example, the metrics producer 202A could transmit the metric dataset according to a schedule or in response to a triggering event, among other possibilities.

In turn, at block 404, the metrics ingestion subsystem 204a may provide the received metric dataset to the metrics management engine 204d. In this respect, the metrics ingestion subsystem 204a may provide the received metric dataset to the metrics management engine 204d either by passing the received metric dataset directly to the metrics management engine 204d or by writing the received metric dataset to a designated storage location within the metrics storage subsystem 204b (e.g., a temporary queue) that is then read by the metrics management engine 204d in order to access the received metric dataset, among other possibilities.

For each sample of metric data in the received metric dataset, the metrics management engine 204d may then carry out a sequence of operations in order to make a handling decision with respect to the sample, which will now be explained with reference to a sample of one given metric that may be included within the received metric dataset.

At block 406, the metrics management engine 204d may determine whether it is provisioned with a metric handling rule that is applicable to the sample of the given metric. The metrics management engine 204d may accomplish this by comparing, for each metric handling rule that the metrics management engine 204d is provisioned with, the given metric for which the sample was received (which may be identified as part of the sample) with the metric handling rule's identified set of one or more metrics in order to determine whether there is any metric handling rule that is applicable to the given metric.

In practice, the metrics management engine 204d may make this determination in various ways. As one possibility, the metrics management engine 204d may rank the metric handling rules it is provisioned with, such that when the metrics management engine 204d determines whether it is provisioned with a metric handling rule that is applicable to the sample of the given metric, the metrics management engine 204d may work down a ranked list of all of the metric handling rules that it is configured with until the metrics management engine 204d finds a metric handling rule that has a metric identifier that matches a metric identifier of the sample of the given metric, whether the metric identifier comprises (i) a metric name only, (ii) a metric name and one or more label values (but not all) for the given metric, or (iii) a metric name and a full set of label values for the given metric.

As another possibility, the metrics management engine 204d may start with a most-narrowly-defined metric identifier that may identify the given metric, including (i) the metric name and (ii) a full set of label values for the given metric, determine whether the metrics management engine 204d is provisioned with a metric handling rule for that individual metric (i.e., a metric handling rule defined for a metric having the same metric name and set of label values), and if so, proceed to block 408 and handle the sample of the given metric in accordance with that metric handling rule.

If the metrics management engine 204d is not provisioned with a metric handling rule for the individual metric, however, then the metrics management engine 204d may determine whether the metrics management engine 204d is provisioned with a metric handling rule with a metric identifier that matches a different metric identifier that may identify the given metric, including (i) the metric name and (ii) one or more label values (but not all) of the given metric. In the event that a match is found, the metrics management engine 204d may then proceed to block 408 and handle the sample of the given metric in accordance with that metric handling rule.

The metrics management engine 204d may continue to search for matching metric identifiers, including those that only include a metric name (e.g., without any label values) until either (i) a matching metric identifier of a given metric handling rule that the metrics management engine 204d is provisioned with is found, at which point the metrics management engine 204d may stop looking for further matches and proceed to block 408 and handle the sample of the given metric in accordance with that metric handling rule or (ii) the metrics management engine 204d determines that the broadest metric identifier that may identify the given metric (e.g., a metric name only, without any label values) does not match a metric identifier of any of the metric handling rules defined by the metrics management engine 204d, at which point the metrics management engine 204d may proceed to block 410 and handle the sample for given metric in accordance with its default metric handling behavior, which may be to store the given metric into a "default" storage location within the metrics storage subsystem 204b (among other possibilities).

As yet another possibility, the metrics management engine 204d may perform a similar functionality, with the exception that instead of stopping once a matching metric identifier is found for a metric handling rule that the metrics management engine 204d is provisioned with, the metrics management engine 204d may instead continue until all of the metric handling rules that have a metric identifier that matches some combination of the metric identification information of the given metric have been identified, at which point the metrics management engine 204d may determine which of the matching metric handling rules should be executed based on some preestablished logic for selecting between multiple matching rules. Other possibilities may also exist.

In line with the discussion above, the handling actions that may be performed by the metrics management engine 204d may include (i) blocking the sample for the given metric from being stored, (ii) storing the sample for the given metric in accordance with a given sampling rate, (iii) storing the sample for the given metric in an alternate storage location within the metrics storage subsystem 204b (e.g., a lower tier of storage), and/or (iv) storing the sample for the given metric in a compressed format, among other possible handling actions.

Further, in practice, the metrics management engine 204d may perform the metric handling phase in various other ways, and the example of FIG. 4 is intended to show only one such use case of how the metrics management engine 204d may carry out the metric handling phase.

While the foregoing describes an embodiment where a predicted utilization of metric data for a given set of one or more metrics is determined during a metric learning phase for purposes of creating a metric handling rule that is then deployed and used during a metric handling phase, it should be understood that the predicted utilization of metric data for a given set of one or more metrics could also be determined and used during a metric handling phase. For instance, in one alternate embodiment, the metric management engine 204d may be configured to use logic similar to that described above with reference to block 306 (e.g., a machine learning model, set of user-defined rules, or the like) in order to predict utilization of metric data for the given set of one or more metrics at the time that such metric data is received, and may then use the results of that prediction as a basis for making a handling decision for the received metric data.

To illustrate with an example, the metric management engine 204d may be configured such that, upon receiving new metric data for a given metric, the metric management engine 204d may function to (i) obtain metric utilization information for the given metric (e.g., by determining such metric utilization information based on information about read requests, write requests, and/or queries involving the metric), (ii) based on the obtained metric utilization information, predict a likelihood of metric data for the given metric being utilized in the future using logic similar to that described above with reference to block 306 (e.g., a machine learning model, set of user-defined rules, or the like), and (iii) use the predicted likelihood of metric data for the given metric being utilized in the future as a basis for making a storage handling decision for the received metric data—which may involve deciding whether to offload the received metric data to a different storage location (e.g., a different storage tier), deciding whether to block the received metric data, deciding whether to sample the received metric data, and/or deciding whether to compress the received metric data based on the predicted likelihood.

The functionality that may be carried out by the metrics management engine 204d in order intelligently handle incoming metric data may take various other forms as well. For instance, other example functionality that could be carried out by the metrics management engine 204d in order to intelligently handle incoming metric data is described in U.S. application Ser. No. 17/410,873 entitled "Intelligently Generating and Deploying a Metric Blocklist within a Distributed Computing System to Efficiently Manage Data Metric Requests," which is incorporated herein by reference in its entirety.

Figure 5:
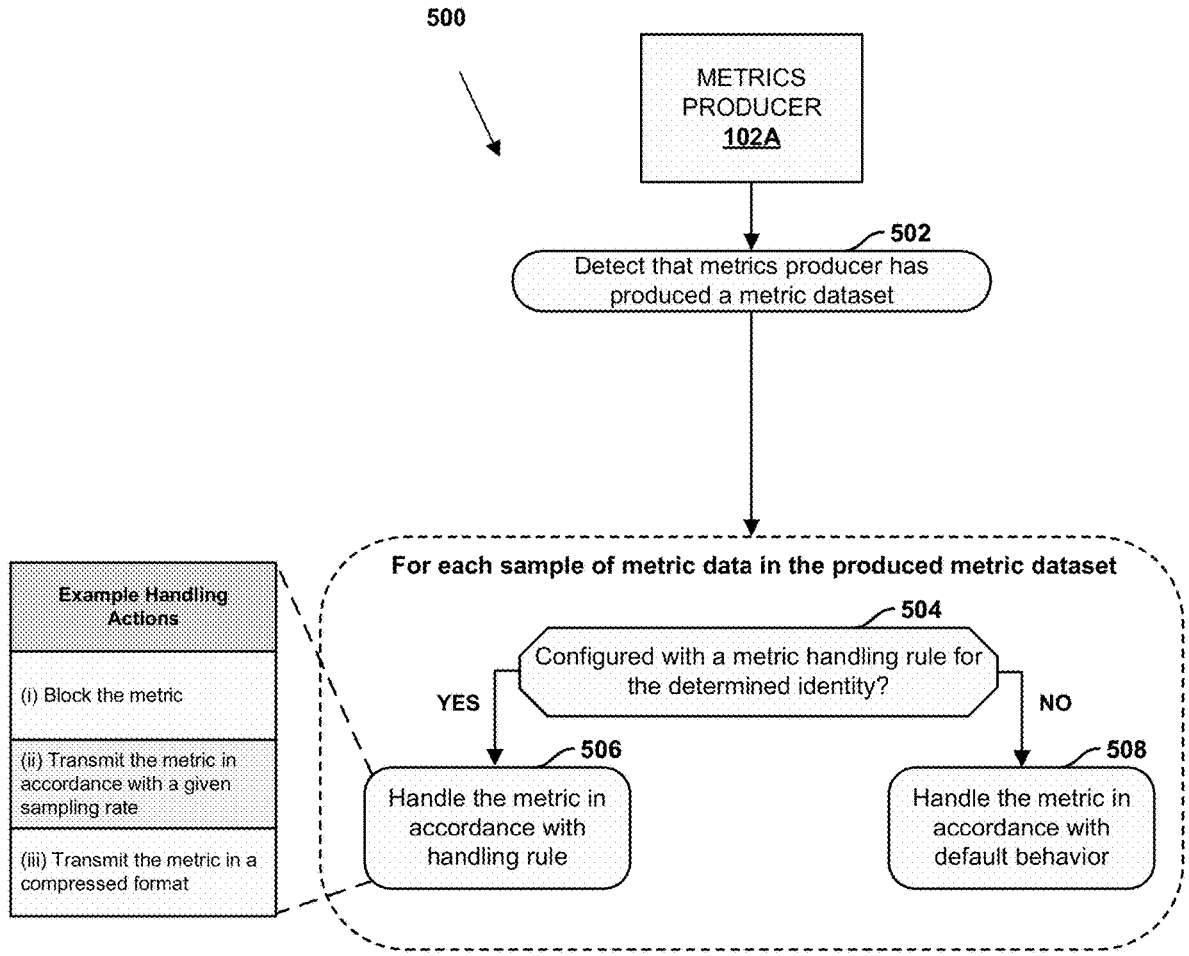
FIG. 5 illustrates a flow diagram of an example use case where metric handling phase functionality is carried out by a metrics management agent of a given metrics producer, in accordance with the present disclosure.

FIG. 5 illustrates a flow diagram 500 of an example use case where the disclosed metric handling phase functionality is carried out by a metrics management agent of a given metrics producer 202, such as the metrics producer 202A.

As shown at FIG. 5, this example use case may begin at block 502 with the metrics producer's metric management agent detecting that the metrics producer 202A has produced a metric dataset for possible transmission to the metrics management platform 204. In line with the discussion above, the metrics producer 202A may take any of various forms, examples of which may include a client device installed with a client application that is configured to produce and transmit metric data (e.g., a mobile application, desktop application, web application, etc.) or a server installed with a server application that is configured to produce and transmit metric data (e.g., a back-end service such as a microservice), among other possibilities.

For each sample of metric data in the produced metric dataset, the metrics management agent may then carry out a sequence of operations in order to make a handling decision with respect the sample, which will now be explained with reference to a sample of one given metric within the received batch.

At block 504, the metrics management agent may determine whether it is provisioned with a metric handling rule that is applicable to the sample of the given metric. The metrics management agent may accomplish this by comparing, for each metric handling rule that the metrics management agent is provisioned with, the given metric for which the sample was produced (which may be identified as part of the sample) with the metric handling rule's identified set of one or more metrics in order to determine whether there is any metric handling rule that is applicable to the given metric.

In practice, the metrics management agent may make this determination in various ways. As one possibility, the metrics management agent may rank the metric handling rules it is provisioned with, such that when the metrics management agent determines whether it is provisioned with a metric handling rule that is applicable to the sample of the given metric, the metrics management agent may work down a ranked list of all of the metric handling rules that it is provisioned with until the metrics management agent finds a metric handling rule that has a metric identifier that matches a metric identifier of the sample of the given metric, whether the metric identifier comprises (i) a metric name only, (ii) a metric name and one or more label values (but not all) for the given metric, or (iii) a metric name and a full set of label values for the given metric.

As another possibility, the metrics management agent may start with a most-narrowly-defined metric identifier that may identify the given metric, including (i) the metric name and (ii) a full set of label values for the given metric, determine whether the metrics management agent is provisioned with a metric handling rule for that individual metric (i.e., a metric handling rule defined for a metric having the same metric name and set of label values), and if so, proceed to block 506 and handle the sample of the given metric in accordance with that metric handling rule.

If the metrics management agent is not provisioned with a metric handling rule for the individual metric, however, then the metrics management agent may determine whether the metrics management agent is provisioned with a metric handling rule with a metric identifier that matches a different metric identifier that may identify the given metric, including (i) the metric name and (ii) one or more label values (but not all) of the given metric. In the event that a match is found, the metrics management agent may then proceed to block 506 and handle the sample of the given metric in accordance with that metric handling rule.

The metrics management agent may continue to search for matching metric identifiers, including those that only include a metric name (e.g., without any label values) until either (i) a matching metric identifier of a given metric handling rule that the metrics management agent is provisioned with is found, at which point the metrics management agent may stop looking for further matches and proceed to block 506 and handle the sample of the given metric in accordance with that metric handling rule or (ii) the metrics management agent determines that the broadest metric identifier that may identify the given metric (e.g., a metric name only, without any label values) does not match a metric identifier of any of the metric handling rules defined by the metrics management agent, at which point the metrics management agent may proceed to block 508 and handle the sample for given metric in accordance with its default metric handling behavior, which may be to transmit the given metric according to a "default" transmission sampling rate (among other possibilities).

As yet another possibility, the metrics management agent may perform a similar functionality, with the exception that instead of stopping once a matching metric identifier is found for a metric handling rule that the metrics management agent is provisioned with, the metrics management agent may instead continue until all of the metric handling rules that have a metric identifier that matches some combination of the metric identification information of the given metric have been identified, at which point the metrics management agent may determine which of the matching metric handling rules should be executed based on some preestablished logic for selecting between multiple matching rules. Other possibilities may also exist.

In line with the discussion above, the handling actions that may be performed by the metrics management agent may include (i) blocking the sample for the given metric from being transmitted, (ii) transmitting the sample for the given metric to the metric management platform 204 in accordance with a given sampling rate, and/or (ii) transmitting the sample for the given metric in a compressed format, among other possible handling actions.

The functionality that may be carried out by a metrics management agent in order intelligently handle produced metric data may take various other forms as well. For instance, other example functionality that could be carried out by a metrics management agent in order to intelligently handle produced metric data is described in U.S. application Ser. No. 17/410,873 entitled "Intelligently Generating and Deploying a Metric Blocklist within a Distributed Computing System to Efficiently Manage Data Metric Requests," which is incorporated herein by reference in its entirety.

While the foregoing technology for intelligently managing metric data is described in the context of a metrics management platform, it should be understood that the disclosed technology may be employed by a platform that is configured to receive, handle, and store other types of data as well. For instance, as one possible implementation, the disclosed technology for handling metric data may be employed by a platform that is also configured to handle log data being produced by log producers-which could either comprise the same computing devices that are generating metric data or different computing devices. In such an implementation, the platform may include both a metrics management engine that is configured to intelligently carry out platform-side handling actions on incoming metric data and also a log management engine that is configured to intelligently carry out platform-side handling actions on incoming log data. And along similar lines, a computing device could be installed with both a metrics management agent that is configured to intelligently carry out producer-side handling actions on produced metric data and a log management agent that is configured to intelligently carry out producer-side handling actions on produced log data. Some examples of log management engines and log management agents that may be utilized together with the metrics management engines and metrics management agents disclosed herein are described in U.S. patent application Ser. No. 18/090,949 entitled "Systems and Methods for Managing Log Data," which is incorporated herein by reference in its entirety.

Figure 6:
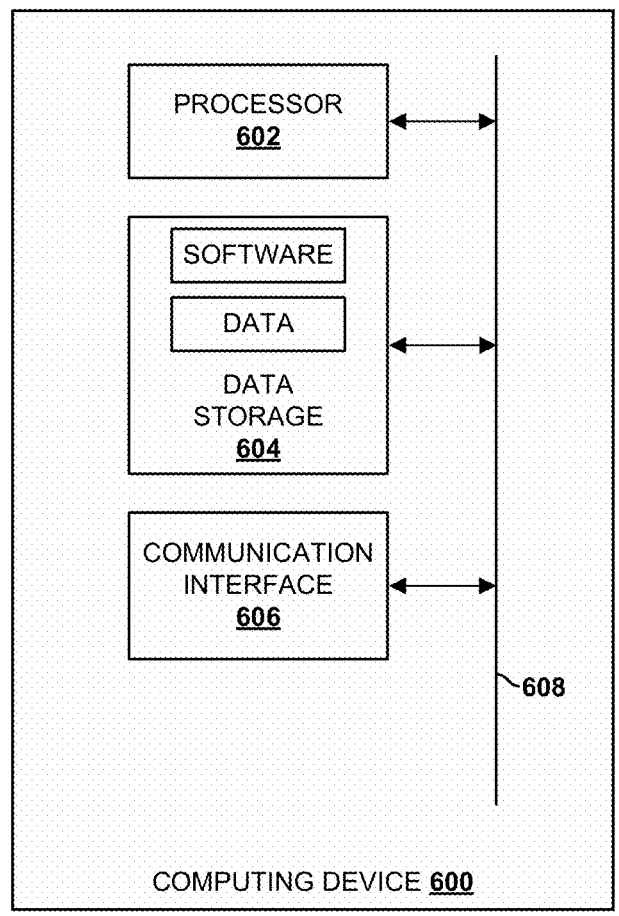
FIG. 6 is a simplified block diagram that illustrates some structural components that may be included in an example computing device.

Turning now to FIG. 6, a simplified block diagram is provided to illustrate some structural components that may be included in an example computing device 600 that may be configured to carry out any of the various functions disclosed herein, including but not limited to the functions of a metrics producer or a metrics consumer, among other possibilities. At a high level, the example computing device

600 may include one or more processors 602, data storage 604, and one or more communication interfaces 606, all of which may be communicatively linked by a communication link 608 that may that various forms, one example of which is a system bus.

The one or more processors 602 of the example computing device 600 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

In turn, the data storage 604 of the example computing device 600 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 602 of the example computing device 600 such that the computing device 600 is configured to perform any of the functions disclosed herein (e.g., functions of a metrics producer or a metrics consumer, etc.), and (ii) data related to the disclosed functionality.

The one or more communication interfaces 606 of the example computing device 600 may take the form of any one or more interfaces that facilitate wireless and/or wired communication with other computing devices or systems, such as a metrics management platform. Each such communication interface 506 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the example computing device 600 may also additionally include an I/O interface, which may generally take the form of (i) one or more input interfaces that are configured to receive and/or capture information at the example computing device 600 and (ii) one or more output interfaces that are configured to output information from the example computing device 600 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of I/O interface may include or provide connectivity to output components such as a display screen and/or an audio speaker, among other possibilities.

It should be understood that the example computing device 600 is one example of a computing device that may be used with the example embodiments described herein. Numerous other arrangements are possible and contemplated herein. For instance, in other embodiments, the example computing device 600 may include additional components not pictured and/or more or fewer of the pictured components.

Figure 7:
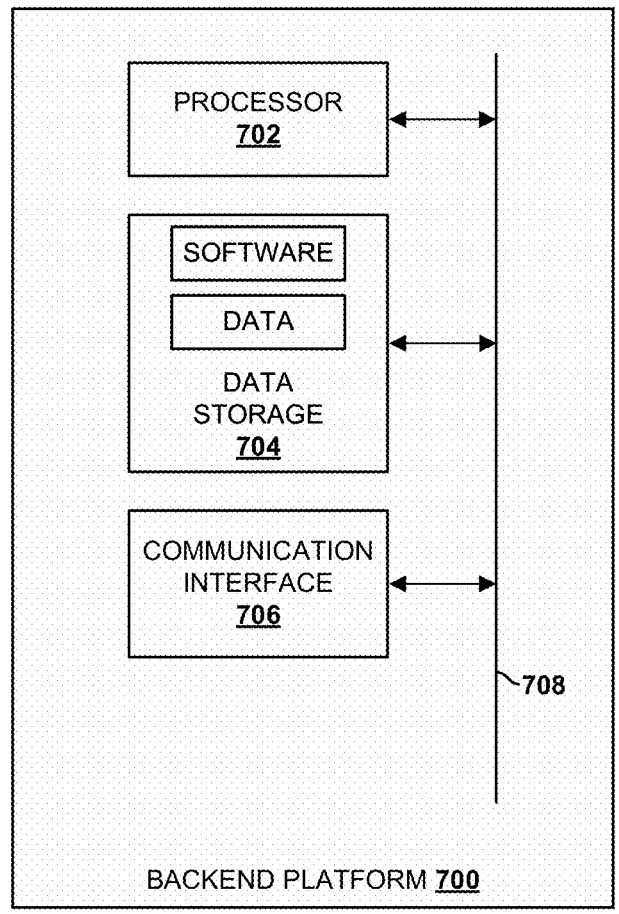
FIG. 7 is a simplified block diagram that illustrates some structural components that may be included in an example back-end platform.

Turning now to FIG. 7, a simplified block diagram is provided to illustrate some structural components that may be included in an example back-end platform 700, which may be configured to carry out any of the various functions disclosed herein, including but not limited to the functions of a metrics management platform (e.g., metrics management platform 204). At a high level, the back-end platform 700 may generally comprise any one or more computing systems that collectively include one or more processors 702, data storage 704, and one or more communication interfaces 706, all of which may be communicatively linked by a communication link 708 that may take the form of a system bus, a communication network such as a public, private, or hybrid cloud, or some other connection mechanism. Each of these components may take various forms.

The one or more processors 702 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities. In line with the discussion above, it should also be understood that the one or more processors 702 could comprise processing components that are distributed across a plurality of physical computing systems connected via a network, such as a computing cluster of a public, private, or hybrid cloud.

In turn, the data storage 704 may comprise one or more non-transitory computer-readable storage mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the one or more processors 702 such that the back-end platform 700 is configured to perform any of the various back-end platform functions disclosed herein, and (ii) data related to the disclosed back-end platform functionality. In line with the discussion above, it should also be understood that the data storage 704 may comprise computer-readable storage mediums that are distributed across a plurality of physical computing systems connected via a network, such as a storage cluster of a public, private, or hybrid cloud that operates according to technologies such as AWS for Elastic Compute Cloud, Simple Storage Service, etc.

The one or more communication interfaces 706 may take the form of any one or more interfaces that facilitate wireless and/or wired communication with other computing devices or systems, including but not limited to metrics producers and metrics consumers, as well as wireless and/or wired communication between functional subsystems of the back-end platform 700. Each such communication interface 706 may take any of various forms, examples of which may include an Ethernet interface, a serial bus interface (e.g., Firewire, USB 3.0, etc.), a chipset and antenna adapted to facilitate any of various types of wireless communication (e.g., Wi-Fi communication, cellular communication, short-range wireless protocols, etc.), and/or any other interface that provides for wireless or wired communication. Other configurations are possible as well.

Although not shown, the back-end platform 700 may additionally include an I/O interface that facilitates user interaction with the back-end platform 700.

It should be understood that back-end platform 700 is one example of a back-end platform that may be used with the embodiments described herein. Numerous other arrangements are possible and contemplated herein. For instance, other back-end platforms 700 may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A method implemented by a computing platform, the method comprising:
    analyzing past utilization of a metric based on (i) read activity information for the metric, (ii) write activity information for the metric, and (iii) query activity information for the metric;
    based on the analyzing, determining a predicted likelihood that metric data for the metric will be utilized in the future;
    using the predicted likelihood to facilitate creation of a metric handling rule comprising a handling action of storing metric data for the metric in a specified storage location;
    receiving metric data for the metric that was produced by a metric producer;
    determining that the metric handling rule applies to the metric; and
    handling the received metric data for the metric in accordance with the metric handling rule by storing the received metric data in the specified storage location.

2. The method of claim 1, wherein the computing platform comprises a multi-tier storage architecture, and wherein the specified storage location comprises a specified tier of the multi-tier storage architecture.

3. The method of claim 2, wherein a default storage location for metric data comprises a first tier of the multi-tier storage architecture, and wherein the specified tier of the multi-tier storage architecture comprises a second tier of the multi-tier storage architecture that differs from the first tier.

4. The method of claim 3, wherein the first tier comprises a hot tier of the multi-tier storage architecture and the second tier comprises a cold tier of the multi-tier storage architecture.

5. The method of claim 1, wherein the metric handling rule further comprises a handling action of sampling metric data for the metric according to a given sampling rate.

6. The method of claim 1, wherein the metric handling rule further comprises a handling action of compressing metric data for the metric.

7. The method of claim 1, wherein the metric handling rule further comprises a handling action of conditionally storing metric data for the metric based on a comparison to previously-stored metric data for the metric.

8. The method of claim 1, wherein the metric handling rule comprises a metric handling rule for a set of multiple metrics that encompasses the metric.

9. A non-transitory computer-readable medium comprising program instructions stored thereon that are executable to cause a computing platform to perform functions comprising:
    analyzing past utilization of a metric based on (i) read activity information for the metric, (ii) write activity information for the metric, and (iii) query activity information for the metric;
    based on the analyzing, determining a predicted likelihood that metric data for the metric will be utilized in the future;
    using the predicted likelihood to facilitate creation of a metric handling rule comprising a handling action of storing metric data for the metric in a specified storage location;
    receiving metric data for the metric that was produced by a metric producer;
    determining that the metric handling rule applies to the metric; and
    handling the received metric data for the metric in accordance with the metric handling rule by storing the received metric data in the specified storage location.

10. The non-transitory computer-readable medium of claim 9, wherein the computing platform comprises a multi-tier storage architecture, and wherein the specified storage location comprises a specified tier of the multi-tier storage architecture.

11. The non-transitory computer-readable medium of claim 10, wherein a default storage location for metric data comprises a first tier of the multi-tier storage architecture, and wherein the specified tier of the multi-tier storage architecture comprises a second tier of the multi-tier storage architecture that differs from the first tier.

12. The non-transitory computer-readable medium of claim 11, wherein the first tier comprises a hot tier of the multi-tier storage architecture and the second tier comprises a cold tier of the multi-tier storage architecture.

13. The non-transitory computer-readable medium of claim 9, wherein the metric handling rule further comprises a handling action of sampling metric data for the metric according to a given sampling rate.

14. The non-transitory computer-readable medium of claim 9, wherein the metric handling rule further comprises a handling action of compressing metric data for the metric.

15. The non-transitory computer-readable medium of claim 9, wherein the metric handling rule further comprises a handling action of conditionally storing metric data for the metric based on a comparison to previously-stored metric data for the metric.

16. A computing platform comprising:
    at least one processor;
    at least one non-transitory computer-readable medium; and
    program instructions stored on the at least one non-transitory computer-readable medium that are executable by the at least one processor such that the computing platform is configured to:
        analyze past utilization of a metric based on (i) read activity information for the metric, (ii) write activity information for the metric, and (iii) query activity information for the metric;
        based on the analyzing, determine a predicted likelihood that metric data for the metric will be utilized in the future;

use the predicted likelihood to facilitate creation of a metric handling rule comprising a handling action of storing metric data for the metric in a specified storage location;

receive metric data for the metric that was produced by a metric producer;

determine that the metric handling rule applies to the metric; and handle the received metric data for the metric in accordance with the metric handling rule by storing the received metric data in the specified storage location.

17. The computing platform of claim 16, further comprising a multi-tier storage architecture, wherein the specified storage location comprises a specified tier of the multi-tier storage architecture.

18. The computing platform of claim 17, wherein a default storage location for metric data comprises a first tier of the multi-tier storage architecture, and wherein the specified tier of the multi-tier storage architecture comprises a second tier of the multi-tier storage architecture that differs from the first tier.

19. The computing platform of claim 18, wherein the first tier comprises a hot tier of the multi-tier storage architecture and the second tier comprises a cold tier of the multi-tier storage architecture.

20. The computing platform of claim 16, wherein the metric handling rule further comprises one or more of (i) a handling action of sampling metric data for the metric according to a given sampling rate, (ii) a handling action of compressing metric data for the metric, or (iii) a handling action of conditionally storing metric data for the metric based on a comparison to previously-stored metric data for the metric.

* * * * *